(12) United States Patent
Ohtomo et al.

(10) Patent No.: US 11,333,496 B2
(45) Date of Patent: *May 17, 2022

(54) SURVEYING INSTRUMENT

(71) Applicant: TOPCON Corporation, Tokyo-to (JP)

(72) Inventors: Fumio Ohtomo, Saitama (JP); Kaoru Kumagai, Tokyo-to (JP); Tetsuji Anai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 473 days.

This patent is subject to a terminal disclaimer.

(21) Appl. No.: 16/398,354

(22) Filed: Apr. 30, 2019

(65) Prior Publication Data

US 2019/0339075 A1      Nov. 7, 2019

(30) Foreign Application Priority Data

May 1, 2018   (JP) .............................. JP2018-088254

(51) Int. Cl.
  *G01C 15/00*   (2006.01)
  *G01S 17/08*   (2006.01)
  (Continued)

(52) U.S. Cl.
  CPC ............ *G01C 15/002* (2013.01); *G01B 11/26* (2013.01); *G01C 15/004* (2013.01);
  (Continued)

(58) Field of Classification Search
  CPC .... G01C 15/002; G01C 15/004; G01B 11/26; G01S 7/4817; G01S 7/4861; G01S 7/51; G01S 17/08
  (Continued)

(56) References Cited

U.S. PATENT DOCUMENTS

| 9,897,436 B2 | 2/2018 | Ohtomo et al. |
| 2007/0064246 A1 | 3/2007 | Braunecker et al. |
| (Continued) | | |

FOREIGN PATENT DOCUMENTS

| JP | 2016-151422 A | 8/2016 |
| JP | 2016-151423 A | 8/2016 |
| (Continued) | | |

OTHER PUBLICATIONS

European communication dated Oct. 14, 2019 in corresponding European patent application No. 19171392.4.

*Primary Examiner* — Daniel L Murphy
(74) *Attorney, Agent, or Firm* — Nields, Lemack & Frame, LLC

(57) ABSTRACT

A surveying instrument comprises a monopod installed on a reference point, a surveying instrument main body provided at a known distance from a lower end of the monopod and at a known angle with respect to an axis of the monopod and having a reference optical axis, wherein the surveying instrument main body performs an image pickup of an object to be measured and scans the object to be measured by a closed loop scan pattern respectively at a pre-rotation and a post-rotation of the surveying instrument main body, obtains cross points of a locus of a scan pattern of the pre-rotation and the post-rotation, obtains deflection angles of the cross point with respect to the reference optical axis of the pre-rotation and the post-rotation, and calculates a rotation angle of the surveying instrument main body based on a deviation between both of the deflection angles.

20 Claims, 13 Drawing Sheets

(51) Int. Cl.
  *G01S 17/89* (2020.01)
  *G01S 7/481* (2006.01)
  *G01S 7/486* (2020.01)
  *G01S 7/51* (2006.01)
  *G01B 11/26* (2006.01)
  *G01S 7/4861* (2020.01)

(52) U.S. Cl.
  CPC .......... *G01S 7/4817* (2013.01); *G01S 7/4861* (2013.01); *G01S 7/51* (2013.01); *G01S 17/08* (2013.01)

(58) Field of Classification Search
  USPC ....................................................... 356/4.01
  See application file for complete search history.

(56) References Cited

U.S. PATENT DOCUMENTS

| | | |
|---|---|---|
| 2016/0238385 A1 | 8/2016 | Ohtomo et al. |
| 2016/0238708 A1 | 8/2016 | Ohtomo et al. |
| 2016/0259039 A1 | 9/2016 | Ohtomo et al. |
| 2017/0227357 A1 | 8/2017 | Ohtomo et al. |
| 2018/0106615 A1 | 4/2018 | Ohtomo et al. |
| 2019/0360806 A1* | 11/2019 | Ohtomo ................ G01S 7/4817 |

FOREIGN PATENT DOCUMENTS

| | | |
|---|---|---|
| JP | 2016-161411 A | 9/2016 |
| JP | 2017-142081 A | 8/2017 |

\* cited by examiner

SURVEYING INSTRUMENT

BACKGROUND OF THE INVENTION

The present invention relates to a surveying instrument which can be easily installed.

In a case where a survey (a measurement of a three-dimensional shape or three-dimensional coordinates) is carried out by using a surveying instrument, a directional angle and a distance of an object to be measured need to be measured, and a three-dimensional laser scanner is often used. However, in the survey, there are many cases that a clear visibility cannot be obtained. For this reason, it is necessary to frequently change an installation position of the surveying instrument, to perform a measurement from various directions, and to combine measurement results.

In general, to detect a rotation angle of the surveying instrument, an angle detector attached to a rotation shaft such as an encoder constituted of a rotor and a stator is used. This type of angle detector requires a high accuracy, must be securely stabilized at a time of installation, and is unsuitable for an application in which the installation position is frequently changed. Further, because it is necessary to use the angle detector with high accuracy, a manufacturing cost of the surveying instrument has been increased.

SUMMARY OF INVENTION

It is an object of the present invention to provide a surveying instrument which obtains a rotation angle based on images and a scan information by an arithmetic processing without providing a rotation angle detector.

To attain the object as described above, a surveying instrument according to the present invention comprises a monopod installed on a reference point, a surveying instrument main body provided at a known distance from a lower end of the monopod and at a known angle with respect to an axis of the monopod and having a reference optical axis, and an operation panel provided on the monopod and having a display unit, wherein the surveying instrument main body includes a measuring unit for irradiating a distance measuring light, for receiving a reflected distance measuring light and for measuring a distance to an object to be measured, an optical axis deflector for deflecting the distance measuring light with respect to the reference optical axis, a measuring direction image pickup module which includes the object to be measured and for acquiring an observation image in a predetermined relationship with the reference optical axis, an attitude detector for detecting a tilt of the surveying instrument main body with respect to the horizontal, and an arithmetic control module for making the measuring unit perform a distance measurement along a predetermined scan pattern, and wherein the arithmetic control module performs an image pickup of the object to be measured by the measuring direction image pickup module and scans the object to be measured with the distance measuring light by a closed loop scan pattern respectively at a pre-rotation and a post-rotation of the surveying instrument main body, obtains a cross point of a locus of the scan pattern of the pre-rotation and a locus of the scan pattern of the post-rotation based on an image of the pre-rotation and an image of the post-rotation, obtains a deflection angle of the cross point with respect to the reference optical axis of the pre-rotation and a deflection angle of the cross point with respect to the reference optical axis of the post-rotation, and calculates a rotation angle of the surveying instrument main body based on a deviation between both of the deflection angles.

Further, in the surveying instrument according to a preferred embodiment, the arithmetic control module obtains the locus of the scan pattern of the pre-rotation and the locus of the scan pattern of the post-rotation and sets points which are the same distance from the reference point on each locus as the cross point.

Further, in the surveying instrument according to a preferred embodiment, the arithmetic control module associates the observation image acquired at the pre-rotation and a scan result of the pre-rotation with the observation image acquired at the post-rotation and a scan result of the post-rotation respectively, synthesizes the observation image of the pre-rotation with the observation image of the post-rotation based on the cross point and creates a synthesized image.

Further, in the surveying instrument according to a preferred embodiment, the arithmetic control module calculates a rotation angle of the surveying instrument main body based on a positional deviation between the reference optical axis of the pre-rotation and the reference optical axis of the post-rotation in the synthesized image.

Further, in the surveying instrument according to a preferred embodiment, the arithmetic control module calibrates an image distortion of the observation image based on a deflection angle information with respect to the locus of the scan pattern.

Further, in the surveying instrument according to a preferred embodiment, the arithmetic control module converts the rotation angle of the surveying instrument main body into a horizontal rotation angle based on a detection result of the attitude detector.

Furthermore, the surveying instrument according to a preferred embodiment further comprises an external image pickup module which is provided at a known position with respect to the surveying instrument main body and has a known relationship with respect to the reference optical axis, wherein the external image pickup module has an external image pickup optical axis directed toward a lower side and acquires a lower image including a lower end and a periphery of the monopod, and wherein the arithmetic control module obtains a displacement between the lower images of a pre-rotation and a post-rotation by a rotation around an axis of the monopod and calculates the rotation angle of the surveying instrument main body around the reference point based on the displacement.

According to the present invention, the surveying instrument comprises a monopod installed on a reference point, a surveying instrument main body provided at a known distance from a lower end of the monopod and at a known angle with respect to an axis of the monopod and having a reference optical axis, and an operation panel provided on the monopod and having a display unit, wherein the surveying instrument main body includes a measuring unit for irradiating a distance measuring light, for receiving a reflected distance measuring light and for measuring a distance to an object to be measured, an optical axis deflector for deflecting the distance measuring light with respect to the reference optical axis, a measuring direction image pickup module which includes the object to be measured and for acquiring an observation image in a predetermined relationship with the reference optical axis, an attitude detector for detecting a tilt of the surveying instrument main body with respect to the horizontal, and an arithmetic control module for making the measuring unit perform a distance measurement along a predetermined scan pattern, and wherein the arithmetic control module performs an image pickup of the object to be measured by the measuring direction image pickup module and scans the object to be measured with the distance measuring light by a closed loop scan pattern respectively at a pre-rotation and a post-rotation of the surveying instrument main body, obtains a cross point of a locus of the scan pattern of the pre-rotation and a locus of the scan pattern of the post-rotation based on an image of the pre-rotation and an image of the post-rotation, obtains a deflection angle of the cross point with respect to the reference optical axis of the pre-rotation and a deflection angle of the cross point with respect to the reference optical axis of the post-rotation, and calculates a rotation angle of the surveying instrument main body based on a deviation between both of the deflection angles. As a result, a rotation angle detector need not to be additionally provided, a detection error which is unavoidable in a detection of a rotation displacement using images alone can be reduced, and the rotation angle can be calculated with high accuracy.

DETAILED DESCRIPTION OF THE PREFERRED EMBODIMENT

A description will be given on embodiments of the present invention by referring to the attached drawings.

Figure 1:
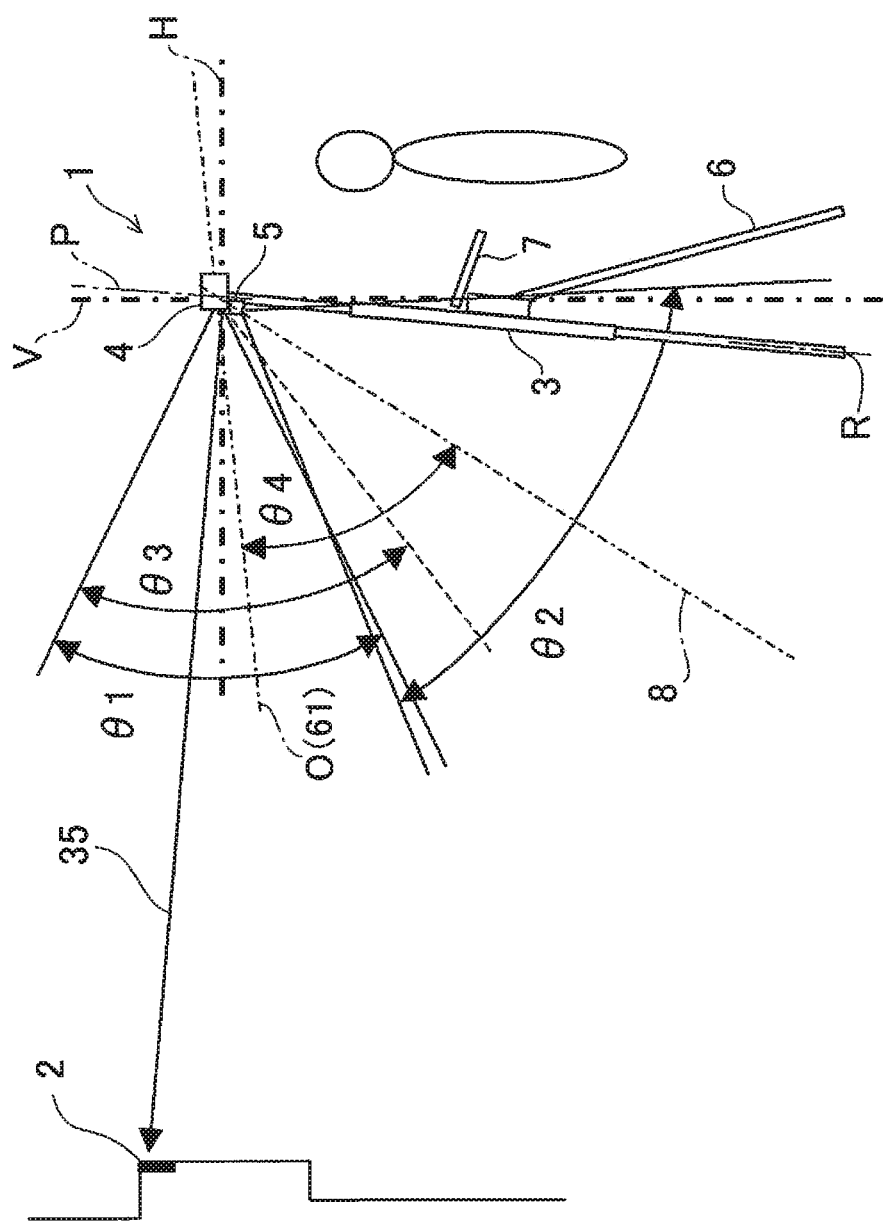
FIG. 1 is a schematical diagram to show a first embodiment of the present invention.

FIG. 1 is a drawing to show an outline of an embodiment of the present invention, and in FIG. 1, reference numeral 1 denotes a surveying instrument of a monopole support type and reference numeral 2 denotes an object to be measured.

The surveying instrument 1 has mainly a monopod (monopole) 3, a surveying instrument main body 4 provided on an upper end of the monopod 3 and an operation panel 7, and the operation panel 7 is provided at an appropriate position of the monopod 3, at a position where a measurement worker can perform an operation easily in a standing attitude, for example.

The operation panel 7 may be provided in a fixed manner with respect to the monopod 3 or may be attachable and detachable. It may be so configured that the operation panel 7 is capable of operating in a state where the operation panel 7 is mounted on the monopod 3. Further, it may be so configured that the operation panel 7 is separated from the monopod 3, and in a state of a single body, the operation panel 7 can be operated. The operation panel 7 and the surveying instrument main body 4 are capable of a data communication via various types of a communication means such as a wired and a wireless.

Further, a single auxiliary leg 6 is foldably mounted at a position below the operation panel 7 of the monopod 3.

A lower end of the monopod 3 has a sharp tip, and the lower end is installed at a reference point R (a point which becomes a reference of a measurement). Further, a distance from the lower end of the monopod 3 to a machine center of the surveying instrument main body 4 (a point which becomes a reference of the measurement in the surveying instrument main body 4) is already-known.

An optical system of the surveying instrument main body 4 has a reference optical axis O approximately extending in a horizontal direction, and the reference optical axis O is set so as to tilt downward by a predetermined angle with respect to a line orthogonal to an axis P of the monopod 3. Therefore, when the monopod 3 is set vertically, the reference optical axis O is tilted downward by the predetermined angle with respect to the horizontal.

The auxiliary leg 6 is foldably connected to the monopod 3 at an upper end of the auxiliary leg 6, and in a state where the auxiliary leg 6 is folded, the auxiliary leg 6 adheres closely to the monopod 3, and a lock mechanism, which holds the close contact state, is provided. Alternatively, in a simplified manner, a band (not shown) bundling the monopod 3 and the auxiliary leg 6 may be provided. In a state where the auxiliary leg 6 is folded, the worker can grip the monopod 3 and can perform a measurement.

The auxiliary leg 6 can rotate around the upper end at a predetermined angle and can be separated away from the monopod 3, and can be fixed at a separated position. When the auxiliary leg 6 is used, the surveying instrument main body 4 is supported by two points, which are the auxiliary leg 6 and the monopod 3, a support of the surveying instrument main body 4 is stabilized, and a stability of the measurement by the surveying instrument main body 4 is improved. It is to be noted that although a description has been given on a case where the number of the auxiliary leg 6 is one, the auxiliary leg 6 may be two. In this case, the monopod 3 can stand alone.

The surveying instrument main body 4 has a distance measuring unit 24 (as described later) and a measuring direction image pickup module 21 (as described later), and further a lower image pickup module 5, which is an external image pickup module, is provided on the surveying instrument main body 4. A reference optical axis of an optical system of the distance measuring unit 24 is the reference optical axis O. An optical axis of the measuring direction image pickup module 21 (hereinafter a first image pickup optical axis 61) is tilted upward by a predetermined angle (6°, for example) with respect to the reference optical axis O, and a distance and a positional relationship between the measuring direction image pickup module 21 and the distance measuring unit 24 are already-known. The distance measuring unit 24 and the measuring direction image pickup module 21 are accommodated in a casing of the surveying instrument main body 4.

The lower image pickup module 5 has an image pickup element such as a CCD and a CMOS, and an image pickup device capable of acquiring a digital image is used as the lower image pickup module 5. Further, a position of a pixel in the image pickup element can be detected with reference to an optical axis of the lower image pickup module 5 (hereinafter a second image pickup optical axis 8). As the lower image pickup module 5, a commercial digital camera can be used, for example.

The lower image pickup module 5 is fixed to the casing of the surveying instrument main body 4, and the lower image pickup module 5 (that is, an image forming position of the lower image pickup module 5) is provided at a known position (distance) with respect to the machine center of the surveying instrument main body 4. The second image pickup optical axis 8 is directed downward and set at the predetermined known angle with respect to the reference optical axis O, and the second image pickup optical axis 8 and the reference optical axis O have a known relationship (distance). It is to be noted that the lower image pickup module 5 may be accommodated in the casing and may be integrated with the surveying instrument main body 4.

A field angle of the measuring direction image pickup module 21 is θ1, the field angle of the lower image pickup module 5 is θ2, and θ1 and θ2 may be equal or may be different. Further, the field angle of the measuring direction image pickup module 21 and the field angle of the lower image pickup module 5 do not have to overlap each other, but they preferably overlap each other by a predetermined amount. Further, the field angle of the lower image pickup module 5 and the direction of the second image pickup optical axis 8 are set so that the lower end of the monopod 3 is included in an image.

A description will be given on an outline configuration of the surveying instrument main body 4 by referring to FIG. 2.

The surveying instrument main body 4 includes a distance measuring light projecting module 11, a light receiving module 12, a distance measurement calculating module 13, an arithmetic control module 14, a first storage module 15, an image pickup control module 16, an image processing module 17, a first communication module 18, an optical axis deflector 19, an attitude detector 20, the measuring direction image pickup module 21, a projecting direction detecting module 22, and a motor driver 23, and they are accommodated in a casing 25 and integrated. It is to be noted that, the distance measuring light projecting module 11, the light receiving module 12, the distance measurement calculating module 13, the optical axis deflector 19 and the like make up a distance measuring unit 24. The distance measuring unit 24 functions as an electronic distance meter.

The distance measuring light projecting module 11 has a projection optical axis 26, and a light emitter 27 such as a laser diode (LD), for example, as a distance measuring light source is provided on the projection optical axis 26. Further, a projecting lens 28 is provided on the projection optical axis 26. Furthermore, the projection optical axis 26 is deflected so as to coincide with a light receiving optical axis 31 (as described later) by a first reflection mirror 29 as a deflecting optical component provided on the projection optical axis 26 and a second reflection mirror 32 as a deflecting optical component provided on the light receiving optical axis 31. The first reflection mirror 29 and the second reflection mirror 32 make up a projection optical axis deflector.

A CPU specialized for this instrument or a general-purpose CPU is used as the distance measurement calculating module 13, and the distance measurement calculating module 13 executes a program (as described later) stored in a storage module and performs a distance measurement or a control. It is to be noted that a part of the functions of the arithmetic control module 14 may be assigned as the distance measurement calculating module 13. The distance measurement calculating module 13 makes the light emitter 27 emit, and the light emitter 27 emits a laser beam. The distance measuring light projecting module 11 projects the laser beam emitted from the light emitter 27 as a distance measuring light 33. It is to be noted that, as the laser beam, any one of a continuous light or a pulsed light or an intermittent modulated light (burst-emitted light) disclosed in Japanese Unexamined Patent Application Publication No. 2016-161411 may be used.

A description will be given on the light receiving module 12. A reflected distance measuring light 34 from an object to be measured 2 enters into the light receiving module 12. The light receiving module 12 has the light receiving optical axis 31, and the projection optical axis 26 deflected by the first reflection mirror 29 and the second reflection mirror 32 coincides with the light receiving optical axis 31. It is to be noted that an axis of a state where the projection optical axis 26 coincides with the light receiving optical axis 31 is a distance measuring optical axis 35.

The optical axis deflector 19 is disposed on the reference optical axis O. A straight optical axis transmitted through a center of the optical axis deflector 19 is the reference optical axis O. The reference optical axis O coincides with the projection optical axis 26, the light receiving optical axis 31 or the distance measuring optical axis 35 when they are not deflected by the optical axis deflector 19.

The reflected distance measuring light 34 is transmitted through the optical axis deflector 19 and is incident onto the light receiving optical axis 31. Further, a focusing lens 38 is disposed on the light receiving optical axis 31. Further, a photodetector 39 such as a photodiode (PD) or an avalanche photodiode (APD) is provided on the light receiving optical axis 31. The focusing lens 38 focuses the reflected distance measuring light 34 on the photodetector 39. The photodetector 39 receives the reflected distance measuring light 34 and produces a photodetecting signal. The photodetecting signal is inputted into the distance measurement calculating module 13, and the distance measurement calculating module 13 calculates a reciprocating time of the distance measuring light based on the photodetecting signal and performs the distance measurement to the object to be measured 2 based on the reciprocating time and a light velocity. Further, the photodetecting signal includes an information of a light receiving intensity of when the reflected distance measuring light 34 is received, and the distance measurement calculating module 13 calculates a reflection intensity from the object to be measured 2.

The first communication module 18 transmits image data acquired by the measuring direction image pickup module 21, image data processed by the image processing module 17, and distance measurement data acquired by the distance measuring unit 24 to the operation panel 7 and receives an operation command from the operation panel 7. The first communication module 18 performs the data communication with a second communication module 67 which will be described later by a required wired or wireless communication means.

As the first storage module 15, a magnetic recording means such as an HD, an FD and the like, an optical recording means such as a CD, a DVD and the like, or a semiconductor recording means such as a memory card, a USB memory and the like is used. In the first storage module 15, various types of programs are stored. These programs include: an image pickup control program, an image processing program, a distance measuring program, a display program, a communication program, an operation command creating program, a tilt angle calculation program for calculating a tilt angle and a tilt direction of the monopod 3 based on an attitude detection result from the attitude detector 20 and for calculating a vertical component of the tilt angle (a tilt angle of the monopod 3 in a front-and-rear direction with respect to the object to be measured 2) and a horizontal component of the tilt angle (a tilt angle of the monopod 3 in a left-and-right direction with respect to the object to be measured 2), a measurement program for carrying out the distance measurement, a deflection control program for controlling a deflecting operation of the optical axis deflector 19, a matching program for generally matching images of a pre-rotation and a post-rotation, a cross point detection program for calculating a cross point in the scan patterns based on a measurement result of the pre-rotation (a scan result) and a measurement result of the post-rotation (a scan result), a calibration program for calibrating the images based on the scan result, a synthesis program for synthesizing the images of the pre-rotation and the post-rotation based on the cross point, a rotation angle calculation program for calculating a rotation angle based on a deflection angle of the cross point or a position of the cross point on the image, a confirmation program for confirming whether the surveying instrument main body 4 moves during one-cycle scanning at one measuring position, a calculation program for executing various types of calculations, or the like. Further, various types of data, such as the distance measurement data, angle measurement data, and the image data are stored in the first storage module 15.

According to an operating state of the surveying instrument main body 4, the arithmetic control module 14 develops and executes the various types of programs, carries out a control of the distance measuring light projecting module 11 by the surveying instrument main body 4, a control of the light receiving module 12, a control of the distance measurement calculating module 13, a control of the measuring direction image pickup module 21, and the like, and performs the distance measurement.

A detailed description will be given on the optical axis deflector 19.

The optical axis deflector 19 is constituted by a pair of optical prisms 41 and 42. The optical prisms 41 and 42 have a disk shape with the same diameter, respectively, are arranged concentrically on the distance measurement optical axis 35 while crossing the distance measurement optical axis 35 at a right angle, and are arranged in parallel at a predetermined interval. The optical prism 41 is formed from an optical glass and has three triangular prisms arranged in parallel. Similarly, the optical prism 42 is also formed from the optical glass and has three triangular prisms arranged in parallel. It is to be noted that the triangular prisms which constitute the optical prism 41 and the triangular prisms which constitute the optical prism 42 all have optical characteristics of the same deflection angle.

A width and a shape of each of the triangular prisms may be the same or may be different. It is to be noted that the widths of the triangular prisms positioned at a center are larger than a beam diameter of the distance measuring light 33, and the distance measuring light 33 is adapted to transmit only the triangular prisms positioned at the center. The triangular prisms positioned other than at the center may be constituted by a plurality of small triangular prisms.

Further, the triangular prisms at the center may be made of an optical glass, and the triangular prisms other than at the center may be made of an optical plastic. That is because a distance from the optical axis deflector 19 to the object to be measured 2 is large, optical characteristics of the triangular prisms at the center require an accuracy, but on the other hand, a distance from each triangular prism other than at the center to the photodetector 39 is small, and highly accurate optical characteristics are not required.

A central part of the optical axis deflector 19 (triangular prisms at the center) is a distance measuring light deflector which is a first optical axis deflector through which the distance measuring light 33 is transmitted and is projected. A portion excluding the central part of the optical axis deflector 19 (both end portions of the triangular prisms at the center and the triangular prisms other than at the center) is a reflected distance measuring light deflector which is a second optical axis deflector through which the reflected distance measuring light 34 is transmitted and enters.

The respective optical prisms 41 and 42 are arranged rotatably individually and independently around the reference optical axis O. The optical prisms 41 and 42 are controlled respectively by the arithmetic control module 14 regarding a rotating direction, a rotation amount and a rotating speed. Thereby, the optical prisms 41 and 42 deflect the projection optical axis 26 of the projected measuring light 33 in an arbitrary direction and also deflect the light receiving optical axis 31 of the received reflected distance measuring light 34 in parallel with the projection optical axis 26.

Further, when the optical prisms 41 and 42 are continuously driven and continuously deflected while continuously irradiating the distance measuring light 33, the distance measuring light 33 can be scanned in a predetermined pattern.

Outer shapes of the optical prisms 41 and 42 are circular around the distance measuring optical axis 35 (the reference optical axis O), respectively, and diameters of the optical prisms 41 and 42 are set so that a sufficient light amount can be obtained by considering a spread of the reflected distance measuring light 34.

A ring gear 45 is fitted on an outer periphery of the optical prism 41, and a ring gear 46 is fitted on an outer periphery of the optical prism 42.

A driving gear 47 is meshed with the ring gear 45, and the driving gear 47 is fixed to an output shaft of a motor 48. Similarly, a driving gear 49 is meshed with the ring gear 46, and the driving gear 49 is fixed to an output shaft of a motor 50. The motors 48 and 50 are electrically connected to the motor driver 23.

As the motors 48 and 50, motors which are capable of detecting the rotation angle are used or motors which rotate corresponding to a driving input value such as a pulse motor, for example, are used. Alternatively, a rotation angle detector which detects rotation amounts (rotation angles) of the motors such as an encoder, for example, may be used and the rotation amounts of the motors 48 and 50 may be detected by the rotation angle detector. The rotation amounts of the motors 48 and 50 are detected, respectively, and the motors 48 and 50 are individually controlled by the motor driver 23.

Further, rotation angles of the prisms 41 and 42 are detected via the rotation amounts of the motors 48 and 50, that is, rotation amounts of the driving gears 47 and 49. It is to be noted that the encoder may be attached directly to the ring gears 45 and 46, respectively, so that the rotation angles of the ring gears 45 and 46 are directly detected by the encoder.

Here, a deflection angle of the optical axis deflector 19 is smaller than the rotation angle of the optical prisms 41 and 42 (for instance, a rotation angle for achieving the deflection angle ±10° is ±40°), and the optical axis deflector 19 can deflect the distance measuring light 33 highly accurately.

The driving gears 47 and 49 and the motors 48 and 50 are provided at positions not interfering with the distance measuring light projecting module 11 such as at lower positions of the ring gears 45 and 46, for instance.

The projecting lens 28, the first reflection mirror 29, the second reflection mirror 32, the distance measuring light deflector and the like make up a projection optical system. Further, the reflected distance measuring light deflector, the focusing lens 38 and the like make up a light receiving optical system.

The distance measurement calculating module 13 controls the light emitter 27 and makes the light emitter 27 pulse-emit or burst-emit (intermittently emit) the laser beam as the distance measuring light 33. The projection optical axis 26 (that is, the distance measuring optical axis 35) is deflected by the distance measuring light deflector so that the distance measuring light 33 is directed toward the object to be measured 2. The distance measurement is performed in a state where the distance measurement optical axis 35 sights the object to be measured 2.

The reflected distance measuring light 34 as reflected from the object to be measured 2 is incident through the reflected distance measuring light deflector and the focusing lens 38, and the reflected distance measuring light 34 is received by the photodetector 39. The photodetector 39 sends out the photodetecting signal to the distance measurement calculating module 13, and the distance measurement calculating module 13 performs the distance measurement of a measuring point (a point irradiated by the distance measuring light) for each pulsed light based on the photodetecting signal from the photodetector 39, and the distance measurement data is stored in the first storage module 15.

The projecting direction detecting module 22 counts driving pulses inputted into the motors 48 and 50 and detects the rotation angles of the motors 48 and 50. Alternatively, the projecting direction detecting module 22 detects the rotation angles of the motors 48 and 50 based on a signal from the encoder. Further, the projecting direction detecting module 22 calculates rotational positions of the optical prisms 41 and 42 based on the rotation angles of the motors 48 and 50.

Further, the projecting direction detecting module 22 calculates a deflection angle and a projecting direction (deflecting direction) of the distance measuring light 33 with respect to the reference optical axis O for each pulsed light based on refractive indexes of the optical prisms 41 and 42, the rotational position of when the optical prisms 41 and 42 are integrated, and a relative rotation angle between ire both optical prisms 41 and 42 in real time. A calculation result (an angle measurement result) is associated with the distance measurement result and is inputted into the arithmetic control module 14. It is to be noted that in a case where the distance measuring light 33 is burst-emitted, the distance measurement is performed for each intermittent distance measuring light.

As the arithmetic control module 14, a CPU specialized for this instrument or a general-purpose CPU is used and the arithmetic control module 14 executes a program stored in the first storage module 15 and executes various types of calculations, a processing such as a creation of three-dimensional data, and various types of controls. By controlling the rotating directions and the rotating speeds of the motors 48 and 50 and a rotation ratio between the motors 48 and 50, the arithmetic control module 14 controls a relative rotation and an entire rotation of the optical prisms 41 and 42 and controls a deflecting action by the optical axis deflector 19. Further, the arithmetic control module 14 calculates a horizontal angle and a vertical angle of the measuring point with respect to the reference optical axis O from the deflection angle and the projecting direction of the distance measuring light 33. Further, the arithmetic control module 14 associates the horizontal angle and the vertical angle regarding the measuring point with the distance measurement data and can acquire three-dimensional data of the measuring point. Thus, the surveying instrument 1 functions as a total station.

Further, a scanning can be performed in an arbitrary pattern within a range of a maximum deflection angle of an optical axis deflector 19 as described later.

Subsequently, a description will be given on the attitude detector 20. The attitude detector 20 detects tilt angles with respect to the horizontal and the vertical of the measuring instrument main body 4, and the detection result is inputted to the arithmetic control module 14. It is to be noted that as the attitude detector 20, an attitude detector disclosed in Japanese Unexamined Patent Application Publication No. 2016-151423 can be used.

The attitude detector 20 will be described in brief. The attitude detector 20 has a frame 54. The frame 54 is fixed to the casing 25 or fixed to a structural component and is integrated with the surveying instrument main body 4.

A sensor block 55 is mounted on the frame 54 via a gimbal. The sensor block 55 is rotatable by 360° or over 360° in two directions around two axes crossing each other at a right angle, respectively.

A first tilt sensor 56 and a second tilt sensor 57 are mounted on the sensor block 55. The first tilt sensor 56 is a sensor which detects the horizontal with high accuracy, for instance, a tilt detector which makes a detection light enter a horizontal liquid surface, and detects the horizontal according to a change of a reflection angle of a reflected light or an air bubble tube which detects the tilt according to a positional change of sealed air bubbles. Further, the second tilt sensor 57 is a sensor which detects a tilt change with high responsiveness, for instance an acceleration sensor.

Each of relative rotation angles of the two axes of the sensor block 55 with respect to the frame 54 are configured to be detected by encoders 58 and 59, respectively.

Further, motors (not shown) which rotate the sensor block 55 in order to maintain the sensor block 55 horizontally are provided in relation with the two axes, respectively. The motors are controlled by the arithmetic control module 14 so that the sensor block 55 is maintained horizontally based on detection results from the first tilt sensor 56 and the second tilt sensor 57.

In a case where the sensor block 55 is tilted (in a case where the surveying instrument main body 4 is tilted), the relative rotation angle of each axial direction of the frame 54 with respect to the sensor block 55 (horizontal) is detected by the encoders 58 and 59, respectively. Based on the detection results of the encoders 58 and 59, the tilt angles of the surveying instrument main body 4 with respect to the two axes are detected and the tilt direction of the surveying instrument main body 4 is determined by synthesizing the tilts of the two axes.

The sensor block 55 is rotatable by 360° or over 360° with respect to the two axes and hence, whatever the attitude detector takes any attitude or even if the attitude detector 20 is inverted upside down, for example, the attitude detector 20 is capable of an attitude detection (the tilt angle and the tilting direction with respect to the horizontal) in all the directions.

In the attitude detection, in a case where high responsiveness is required, the attitude detection and an attitude control are performed based on the detection result of the second tilt sensor 57, but the second tilt sensor 57 has a detection accuracy poorer than the first tilt sensor 56 in general.

The attitude detector 20 includes the first tilt sensor 56 with high accuracy and the second tilt sensor 57 with high responsiveness. Thereby, it is possible to perform the attitude control based on the detection result of the second tilt sensor 57 and further, to perform the attitude detection with high accuracy by the first tilt sensor 56.

The detection result of the second tilt sensor 57 can be calibrated based on the detection result of the first tilt sensor 56. That is, if a deviation is caused between values of the encoders 58, 59 of when the first tilt sensor 56 detects the horizontal, that is, an actual tilt angle, and the tilt angle detected by the second tilt sensor 57, the tilt angle of the second tilt sensor 57 can be calibrated based on the deviation.

Therefore, if the relationship between a detected tilt angle of the second tilt sensor 57 and a tilt angle, which is obtained based on the horizontal detection by the first tilt sensor 56 and the detection results of the encoders 58 and 59, is obtained in advance, the arithmetic control module 14 can calibrate the tilt angle detected by the second tilt sensor 57, and an accuracy of the attitude detection with high responsiveness by the second tilt sensor 57 can be improved based on this calibration. In a state where there is a small environmental change (a temperature or the like), the tilt detection may be performed based on the detection result of the second tilt sensor 57 and a correction value.

The arithmetic control module 14 controls the motors based on the signal from the second tilt sensor 57 when a tilt fluctuation is large and when the tilt change is rapid. Further, the arithmetic control module 14 controls the motors based on the signal from the first tilt sensor 56 when the tilt fluctuation is small and when the tilt change is mild, that is, in a state where the first tilt sensor 56 is capable of following up. It is to be noted that by calibrating the tilt angle detected by the second tilt sensor 57 at all times, the attitude detection by the attitude detector 20 may be performed based on the detection result from the second tilt sensor 57.

In the first storage module 15, comparison data indicating a comparison result between the detection result of the first tilt sensor 56 and the detection result of the second tilt sensor 57 is stored. The detection result by the second tilt sensor 57 is calibrated based on the signal from the first tilt sensor 56. By this calibration, the detection result by the second tilt sensor 57 can be improved to the detection accuracy of the first tilt sensor 56. Thus, in the attitude detection by the attitude detector 20, high responsiveness can be realized while high accuracy is maintained.

The arithmetic control module 14 calculates an inclination angle of the monopod 3 in the front-and-rear direction (an inclination angle in an approaching and separating direction with respect to the object to be measured 2) and an inclination angle of the monopod 3 in the left-and-right direction based on the detection result of the attitude detector 20. The inclination angle in the front-and-rear direction appears as a tilt angle of the reference optical axis O with respect to the horizontal, and the inclination angle in the left-and-right direction appears as an inclination (rotation) of an image acquired by the measuring direction image pickup module 21.

The arithmetic control module 14 calculates a tilt angle of the distance measuring optical axis 35 with respect to the horizontal based on the inclination angles and the deflection angle by the optical axis deflector 19. Further, based on the inclination of the image, an inclination of an image displayed on the display unit 68 (as described later) is corrected and displayed as a vertical image.

The measuring direction image pickup module 21 has the first image pickup optical axis 61 in parallel with the reference optical axis O of the surveying instrument main body 4 and an image pickup lens 62 arranged on the first image pickup optical axis 61. The measuring direction image pickup module 21 is a camera having a field angle 50° to 60°, for instance, substantially equal to a maximum deflection angle θ/2 (±30°, for instance) of the optical prisms 41 and 42. The relationship among the first image pickup optical axis 61, the projection optical axis 26, and the reference optical axis O is already-known, and the distance between each of the optical axes has a known value.

Further, the measuring direction image pickup module 21 can acquire a still image, a continuous image, or a video image in real time. The image acquired by the measuring direction image pickup module 21 is transmitted to the operation panel 7. In the present embodiment, the image is displayed on the display unit 68 (see FIG. 5) of the operation panel 7 as an observation image 81 (see FIG. 3) which is a still image, and the worker can observe the observation image 81 displayed on the display unit 68 and carry out a measurement work. A center of the observation image 81 coincides with the first image pickup optical axis 61, and the reference optical axis O is positioned at a position which deviates from the center of the observation image 81 at a predetermined field angle based on a known relationship between the reference optical axis O and the first image pickup optical axis 61.

The image pickup control module 16 controls an image pickup of the measuring direction image pickup module 21. In a case where the measuring direction image pickup module 21 picks up the video image or the continuous image, the image pickup control module 16 synchronizes a timing of acquiring a frame image constituting the video image or the continuous image with a timing of scanning and of performing the distance measurement by the surveying instrument main body 4 (the timing of measuring distance per a pulsed laser beam). Further, in a case where the measuring direction image pickup module 21 acquires the observation image 81, the image pickup control module 16 synchronizes a timing of acquiring the observation image 81 with the timing of scanning by the surveying instrument main body 4. The arithmetic control module 14 also performs associating the image with the measurement data (distance measurement data, angle measurement data). Further, the image pickup control module 16 performs a synchronization control of the image pickup timing between the measuring direction image pickup module 21 and the lower image pickup module 5 via the first communication module 18 and a second communication module (see FIG. 5).

An image pickup element 63 of the measuring direction image pickup module 21 is a CCD or a CMOS sensor which is an aggregate of pixels and each pixel can specify a position on the image pickup element 63. Each pixel has pixel coordinates in a coordinate system with the first image pickup optical axis 61 as an origin, for instance. The photodetecting signal from each pixel includes an information of the pixel coordinates. Therefore, a position of each pixel on the image pickup element 63 is specified by the pixel coordinates included in the photodetecting signal. Further, since the relationship (distance) between the first image pickup optical axis 61 and the reference optical axis O is already-known, a mutual association between the measuring position by the distance measuring unit 24 and the position (pixel) on the image pickup element 63 can be made. An image signal outputted from the image pickup element 63 is inputted into the image processing module 17 via the image pickup control module 16.

A description will be given on a deflecting action and a scanning action of the optical axis deflector 19.

In a state where the triangular prisms of the optical prism 41 and the triangular prisms of the optical prism 42 are positioned in the same direction, a maximum deflection angle (e.g. 30°) can be obtained. Further, in a state where either one of the optical prisms 41 and 42 is positioned in a position where either one of the optical prisms is rotated by 180° with respect to the other of the optical prism, mutual optical actions of the optical prisms 41 and 42 are offset, and the deflection angle becomes 0°. In this state, a minimum deflection angle can be obtained. Therefore, the optical axis of the laser beam (the distance measuring optical axis 35) projected and received via the optical prisms 41 and 42 coincides with the reference optical axis O.

The distance measuring light 33 is emitted from the light emitter 27, and the distance measuring light 33 is made to parallel fluxes by the projecting lens 28. The distance measuring light 33 is transmitted through the distance measuring light deflector and is projected toward the object to be measured 2. Here, since the distance measuring light 33 is transmitted through the distance measuring light deflector, the distance measuring light 33 is deflected in a required direction by the triangular prisms at the center and projected.

Here, the distance measuring light 33 is all transmitted through the triangular prisms at the center and affected by an optical action of the triangular prisms at the center but since the optical action is provided from a single optical component, a luminous flux is not disordered, and a deflection accuracy is high. Further, since the optical glass is used as the triangular prisms at the center, the deflection accuracy can be further increased.

The reflected distance measuring light 34 reflected by the object to be measured 2 transmits through the reflected distance measuring light deflector and enters and is focused on the photodetector 39 by the focusing lens 38.

Since the reflected distance measuring light 34 is transmitted through the reflected distance measuring light deflector, an optical axis of the reflected distance measuring light 34 is deflected by the triangular prisms other than at the center so as to coincide with the light receiving optical axis 31.

Here, for the triangular prisms other than at the center used as the reflected distance measuring light deflector, the optical plastic may be used, or a Fresnel prism which is an aggregate of small triangular prisms may be used. Since a distance between the optical axis deflector 19 and the photodetector 39 is short, a high accuracy is not required in the reflected distance measuring light deflector.

The deflecting direction and the deflection angle of the distance measuring light 33 as projected can be arbitrarily changed by the combination of the rotational positions of the optical prism 41 and the optical prism 42.

Figure 2:
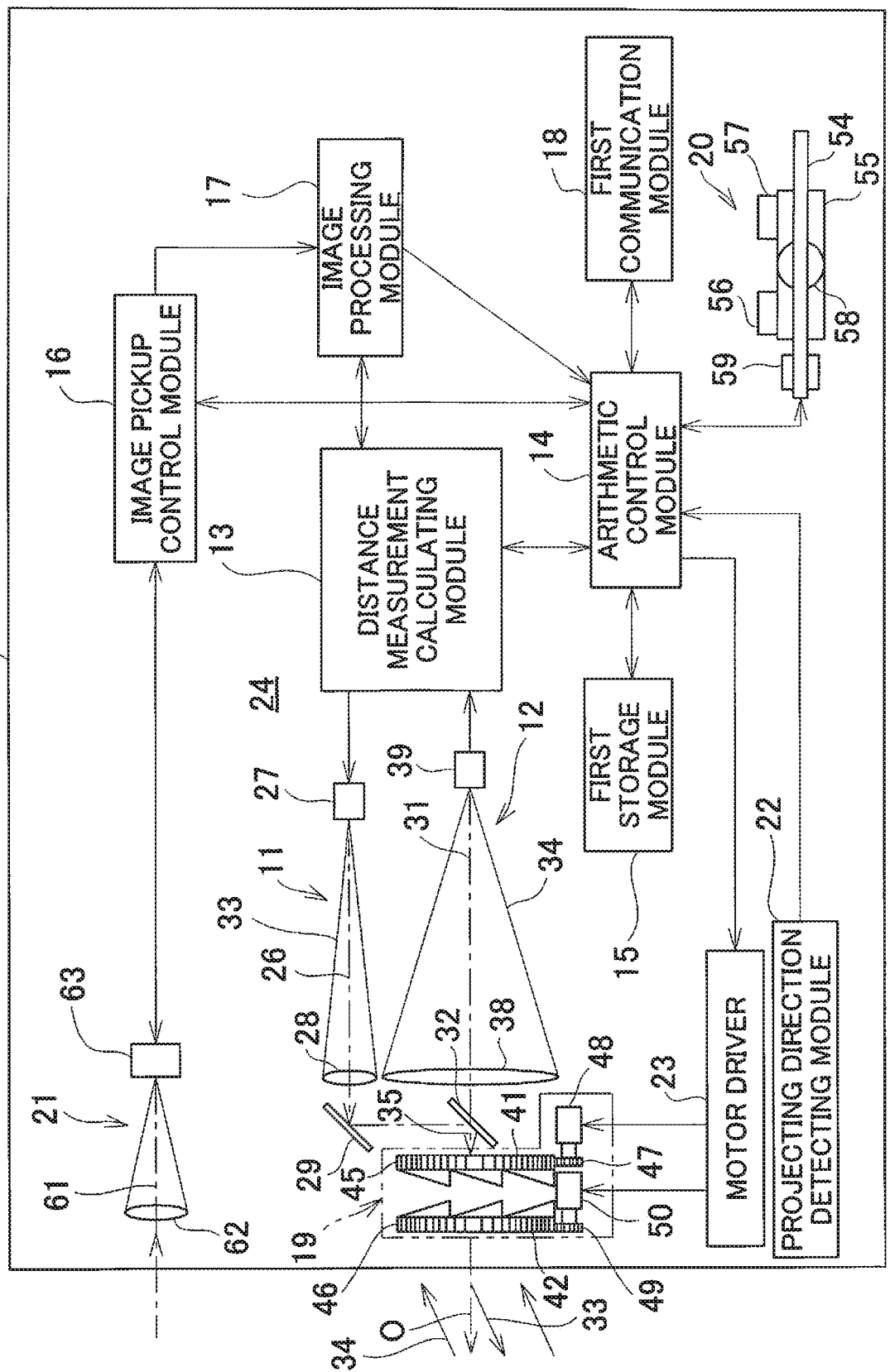
FIG. 2 is a schematical block diagram to show a surveying instrument main body.

Further, when the optical prism 41 and the optical prism 42 are integrally rotated by the motors 48 and 50 in a state where the positional relationship between the optical prism 41 and the optical prism 42 is fixed (in a state where the deflection angle as obtained by the optical prism 41 and the optical prism 42 is fixed), a locus drawn by the distance measuring light 33 as transmitted through the distance measuring light deflector becomes a circle around the reference optical axis O (see FIG. 2).

Therefore, if the optical axis deflector 19 is rotated while the laser beam is emitted from the light emitter 27, the distance measuring light 33 is allowed to perform the scanning with a circular locus. It is needless to say that the reflected distance measuring light deflector is integrally rotated with the distance measuring light deflector.

Assuming that the deflecting direction of the optical axis deflected by the optical prism 41 is a deflection A and the deflecting direction of the optical axis deflected by the optical prism 42 is a deflection B, the deflection of the optical axis by the optical prisms 41 and 42 becomes a synthetic deflection C as an angular difference 9 between the optical prisms 41 and 42.

Therefore, when the optical prism 41 and the optical prism 42 are reversely rotated at an equal speed, the distance measuring light 33 is allowed to perform a reciprocal scanning with a linear locus in a direction of the synthetic deflection C.

Further, when the optical prism 42 is rotated at a rotating speed lower than a rotating speed of the optical prism 41, the distance measuring light 33 is rotated while the angular difference 8 is gradually increased. Therefore, a scan locus of the distance measuring light 33 becomes spiral.

Further, by individually controlling the rotating directions and the rotating speeds of the optical prism 41 and the optical prism 42, various two-dimensional scan patterns of the scan locus of the distance measuring light 33 with the reference optical axis O as a center can be obtained.

Figure 3:
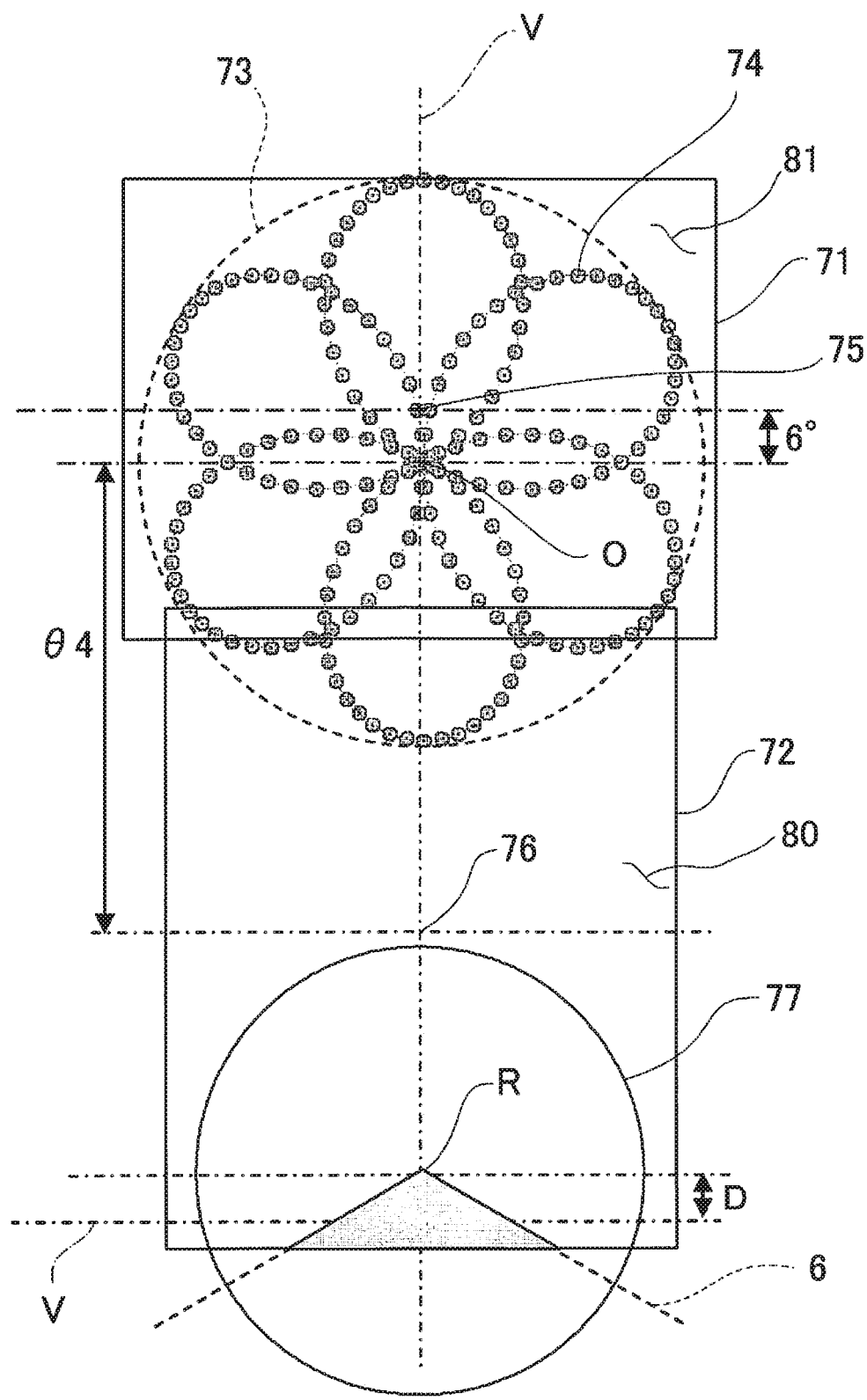
FIG. 3 is a drawing to show a relationship between images acquired by a measuring direction image pickup module and a lower image pickup module and a scan locus by the surveying instrument main body.

For example, when the one optical prism 41 in the optical prism 41 and the optical prism 42 is rotated in a forward direction at 17.5 Hz and the other optical prism 42 is rotated at 5 Hz in an opposite direction, a flower petal-shaped two-dimensional closed loop scan pattern (flower petal pattern 74 (a hypotrochoid curve)) as shown in FIG. 3 is obtained.

Figure 4A:
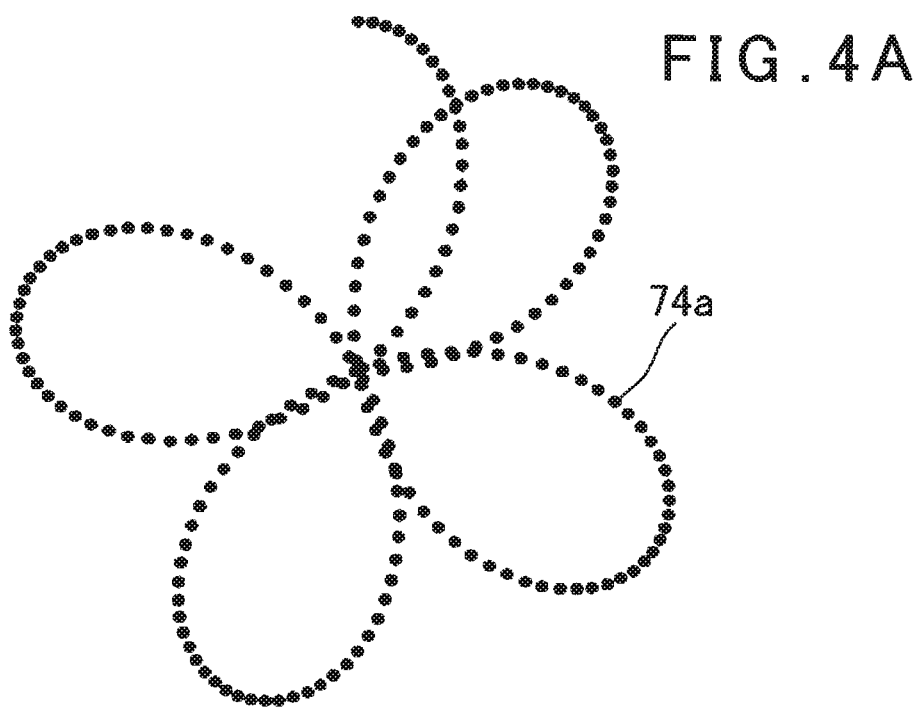
FIG. 4A is an explanatory drawing to show a scan locus obtained in a first half of scanning.
Figure 4B:
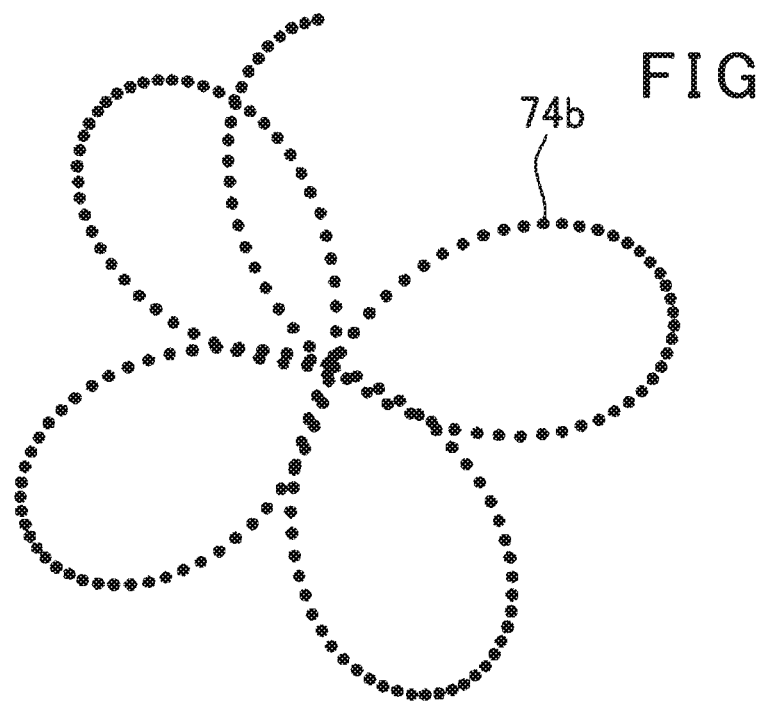
FIG. 4B is an explanatory drawing to show a scan locus obtained in a second half of scanning.

In a case where the optical prisms 41 and 42 are rotated under the above-described conditions, in a first half (0 to 0.2 sec), a first-half locus 74a of the flower petal pattern 74 as shown in FIG. 4A is obtained. Further, in a second half (0.2 to 0.4 sec), a second-half locus 74b of the flower petal pattern 74 as shown in FIG. 4B is obtained. When the first-half locus 74a is combined with the second-half locus 74b, the flower petal pattern 74 having a cycle of 0.4 sec is formed.

A description will be given on the lower image pickup module 5.

The lower image pickup module 5 is electrically connected to the surveying instrument main body 4, and image data acquired by the lower image pickup module 5 is inputted into the surveying instrument main body 4.

An image pickup of the lower image pickup module 5 is synchronously controlled with the image pickup of the measuring direction image pickup module 21 and a distance measurement of the distance measuring unit 24 by the image pickup control module 16. The lower image pickup module 5 is provided at an already-known position with respect to the machine center of the surveying instrument main body 4, and the distance between the lower image pickup module 5 and the lower end of the monopod 3 is also already-known.

Further, regarding the second image pickup optical axis 8 of the lower image pickup module 5, there is a known relationship in an angle between the second image pickup optical axis 8 and the reference optical axis O and in a position of an intersection between the reference optical axis O and the second image pickup optical axis 8, and the image data acquired by the lower image pickup module 5 is associated with the image as acquired by the measuring direction image pickup module 21 and the distance measurement data as measured by the distance measuring unit 24 and stored in the first storage module 15 by the arithmetic control module 14.

Figure 5:
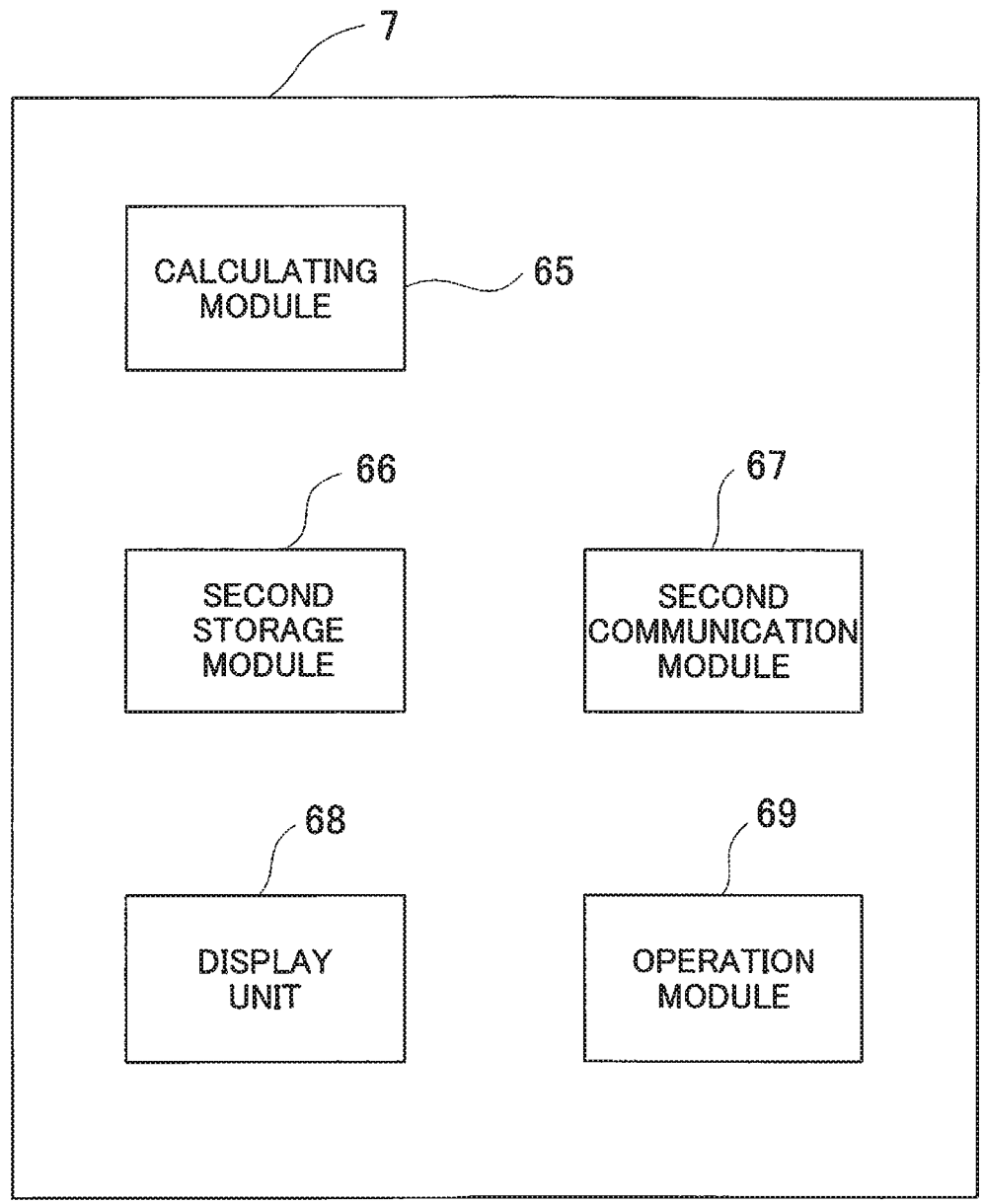
FIG. 5 is a schematical block diagram of an operation panel.
Figure 6:
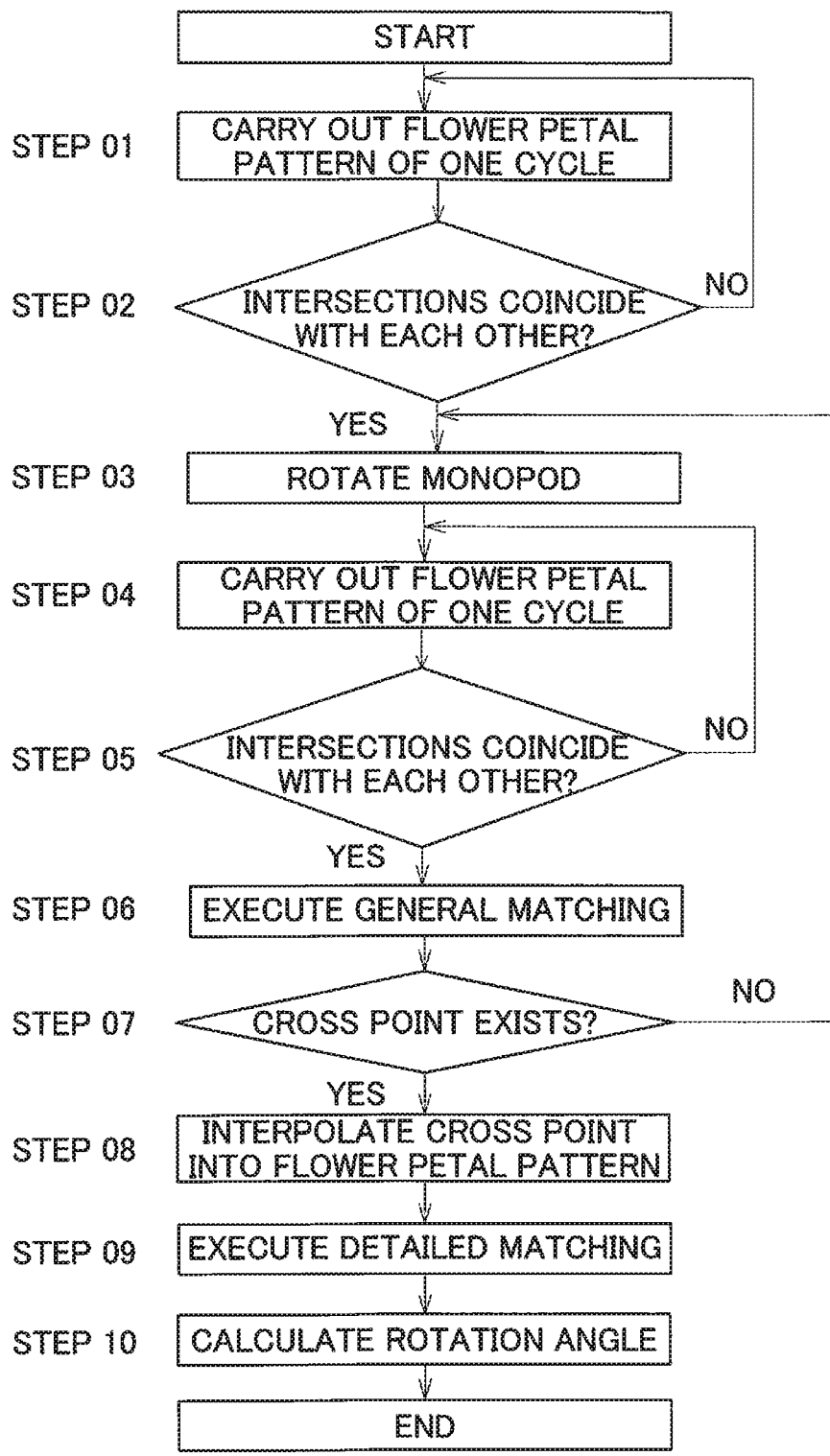
FIG. 6 is a flowchart to explain a calculation method of a rotation angle of the surveying instrument main body.

A description will be given on the operation panel 7 in brief by referring to FIG. 5.

The operation panel 7 may be provided in a fixed manner with respect to the monopod 3 as described above or may be attachable and detachable. Further, in a case where the operation panel 7 is attachable and detachable, the operation panel 7 may be removed from the monopod 3, and in a state of the operation panel 7 only, the worker may hold and operate the operation panel 7.

The operation panel 7 mainly comprises a calculating module 65, a second storage module 66, the second communication module 67, the display unit 68 and an operation module 69. It is to be noted that the display unit 68 may be a touch panel, and the display unit 68 may also serve as the operation module 69. Further, in a case where the display unit 68 is made as the touch panel, the operation module 69 may be omitted. As the calculating module 65, a CPU specialized in this instrument or a general-purpose CPU is used and the CPU executes programs stored in the second storage module 66 and performs a calculation, a processing, and a control.

As the second storage module 66, a magnetic recording means such as an HD, an FD and the like, an optical recording means such as a CD, a DVD and the like, or a semiconductor recording means such as a memory card, a USB memory and the like is used. Various types of programs are stored in the second storage module 66. These programs includes a communication program for performing a communication with the surveying instrument main body 4, an image processing program for performing a processing such as a synthesizing of the image acquired by the lower image pickup module 5 and the image acquired by the measuring direction image pickup module 21, a display program for displaying the image acquired by the lower image pickup module 5, the image acquired by the measuring direction image pickup module 21, and a measurement information measured by the distance measuring unit 24 on the display unit 68, a command creating program for creating a command for the surveying instrument main body 4 based on an information operated by the operation module 69, and the like. Further, in the second storage module 66, the data such as the image data acquired by the lower image pickup module 5, the image data acquired by the measuring direction image pickup module 21, a measurement information measured by the distance measuring unit 24, and the like, may be stored.

The second communication module 67 communicates data such as the measurement data, the image data, the command, and the like, with the image processing module 17 via the arithmetic control module 14 and the first communication module 18.

The display unit 68 displays a measuring state of the surveying instrument main body 4, a measurement result such as a distance, a deflection angle, or a reflected light amount, and the like and displays the images acquired by the lower image pickup module 5 and the measuring direction image pickup module 21 or an image as image-processed by the image processing module 17. Further, the display unit 68 can superimpose the image acquired by the measuring direction image pickup module 21 on a scan locus (the flower petal pattern 74) and display the image acquired by the measuring direction image pickup module 21 and the scan locus. Further, the display unit 68 can display a synthesized image 89 (as described later) acquired by matching a plurality of images acquired in different image pickup directions.

In the present embodiment, the distance measuring light 33 is scanned with a predetermined scan pattern with the reference optical axis O as the center. Further, the reference optical axis O is positioned 60 below with respect to the center of the observation image 81. Therefore, the distance measuring optical axis 35 is deflected in such a manner that the predetermined scan pattern with the reference optical axis O as the center is drawn on the observation image 81.

As the operation panel 7, a smartphone or a tablet may be used, for example. Further, the operation panel 7 may be used as a data collector.

Next, a description will be given on a measuring operation of the surveying instrument 1 by referring to FIG. 1, FIG. 2, FIG. 3, FIG. 4A, FIG. 4B, and FIG. 5. The following measuring operation is performed by the arithmetic control module 14 which executes the program stored in the first storage module 15.

As a preparation for starting the measurement, the lower end of the monopod 3 is positioned at the reference point R, and the monopod 3 is held by the worker. It is to be noted that the operation panel 7 remains in a state mounted on the monopod 3. Further, the surveying instrument 1 is installed in a condition where the lower image pickup module 5 and the measuring direction image pickup module 21 operate.

In a case where the reference optical axis O is directed toward the object to be measured 2, the monopod 3 is rotated around the lower end of the monopod 3, or the monopod 3 is tilted in the front, rear, left, and right directions or spirally rotated. As shown in FIG. 3, the observation image 81, in which the reference optical axis O is positioned 60 below with respect to the center of the image, is displayed on the display unit 68, and a direction and a position of the reference optical axis O can be confirmed from the observation image 81. An inclination angle and a change in the inclination angle of the monopod 3 at this moment are detected by the attitude detector 20.

In a state where the direction of the reference optical axis O is determined, a measurable deflection range 73 with the reference optical axis O as the center can be confirmed on the observation image 81. The worker can designate an arbitrary point in the measurable range in the observation image 81 as a measuring point (the object to be measured 2). By a designation of the object to be measured 2, the arithmetic control module 14 directs the distance measuring optical axis 35 toward the object to be measured 2 by using the optical axis deflector 19.

The distance measuring optical axis 35 is directed toward the object to be measured 2, the distance measuring light 33 is irradiated, and the measurement (a distance measurement, an angle measurement) of the object to be measured 2 is carried out. A direction of the distance measuring light 33, a distance measurement result, and the like are displayed on the display unit 68.

In a case where the object to be measured 2 is changed or is moved to the object to be measured 2 at a different position, the measuring point can be again designated from the observation image 81, but the measuring point can be moved by tilting or rotating the monopod 3 while displaying the observation image 81 on the display unit 68.

In a case where a sighting state of the distance measuring optical axis 35, that is, a state where the distance measuring optical axis 35 coincides with the object to be measured 2, is maintained, the measurement worker may hold the monopod 3, or the auxiliary leg 6 may be pulled out and the monopod 3 may be supported by the auxiliary leg 6.

By supporting the monopod 3 by the auxiliary leg 6, an inclination of the monopod 3 in the front-and-rear direction or the rotation around the lower end of the monopod 3 is limited and a support state of the surveying instrument 1 becomes stable.

It is to be noted that the tilt of the surveying instrument 1 with respect to the horizontal is detected by the attitude detector 20 in real time and thus, the tilt angle and the tilt direction of the surveying instrument 1 with respect to the horizontal is detected in real time, and the measurement result can be corrected in real time based on the detection result. Therefore, a leveling work for adjusting the surveying instrument 1 to the horizontal is not needed, and the fluctuation of the tilt angle caused by a slight swing, or the like, which is generated by a holding of the monopod 3 by the worker can be also corrected in real time.

Next, a description will be given on a general detection of a rotation angle in the horizontal direction around the lower end of the monopod 3 by referring to FIG. 3.

In FIG. 3, reference numeral 71 denotes a first image acquiring range of the measuring direction image pickup module 21, and reference numeral 81 denotes an observation image acquired in the first image acquiring range 71. Further, reference numeral 72 denotes a second image acquiring range of the lower image pickup module 5, and reference numeral 80 denote a lower image acquired in the second image acquiring range 72. Further, reference numeral 73 denotes a deflection range of the distance measuring optical axis 35 by the optical axis deflector 19 within the observation image 81 and the lower image 80, and reference numeral 74 denotes a locus of a case where a distance measuring light is scanned with the flower petal pattern by the optical axis deflector 19 while irradiating the distance measuring light at plural times. Dots indicated in a locus of the flower petal pattern 74 show irradiation points of the distance measuring light of plural times. Further, reference numeral 75 denotes the image center of the observation image 81 (the image center 75 coincides with the first image pickup optical axis 61 and a center of the flower petal pattern 74), and reference numeral 76 denotes an image center of the lower image 80 (the image center 76 coincides with the second image pickup optical axis 8).

Further, in FIG. 1, reference character θ1 denotes a field angle of the measuring direction image pickup module 21, θ2 denotes a field angle of the lower image pickup module 5, and θ3 denotes a scan range of the surveying instrument main body 4, respectively.

Further, in FIG. 3, an angle between the first image pickup optical axis 61 and the second image pickup optical axis 8 is set to 60°, for instance, and the reference optical axis O is tilted downward by 6°, for instance, with respect to the first image pickup optical axis 61, that is, θ4 is 54°. Further, FIG. 3 shows a state where the monopod 3 is held by tilting rearward (a direction separated away from the object to be measured 2) by 50.

The second image pickup optical axis 8 is directed downward, and the second image acquiring range 72 is set so that the lower end of the monopod 3 is included. The drawing shows an example of an image of a range of approximately 80° where the image acquired by the lower image pickup module 5 includes the reference point R.

A circular image with a predetermined radius around this reference point R is set as rotation detection image 77, and the rotation detection image 77 is acquired in real time.

The rotation detection image 77 at the start of the measurement is acquired, and the rotation detection image 77 is set as a rotation reference image.

In a case where a rotation angle after the start of the measurement is detected, a rotation change of the rotation detection image 77 between the rotation reference image and the rotation detection image 77 is detected with respect to the rotation reference image around the reference point R (that is, an image shift in the rotating direction), and the rotation angle is calculated based on the rotation change. The rotation angle is converted to a horizontal rotation angle around the vertical axis based on the detection result of the attitude detector 20. It is to be noted that the detection of the horizontal angle (the calculation of the horizontal angle) may be performed by applying a projection conversion to the rotation detection image 77 based on the detection result of the attitude detector 20, converting the rotation detection image 77 to the horizontal image and then, detecting a horizontal rotation change. It is to be noted that the calculation of the rotation angle and the calculation of the horizontal angle may be performed by the arithmetic control module 14 or may be performed by the calculating module 65.

Alternatively, the observation image 81 at the start of the measurement is acquired, and an image matching of the observation image 81 and the observation image 81 of the post-rotation is performed based on a feature point and the like. A horizontal angle may be obtained based on a deviation of a position of the reference optical axis O between both of the images at this moment, a distance measurement result of the feature points and the like, and the detection result of the attitude detector 20.

Subsequently, as shown in FIG. 1, when the object to be measured 2 is measured by the surveying instrument main body 4, a slope distance to the object to be measured 2 is measured. Further, a deflection angle of the reference optical axis O (6° in FIG. 3) with respect to the first image pickup optical axis 61 and a deflection angle of the distance measuring optical axis 35 with respect to the reference optical axis O are detected by the projecting direction detecting module 22. Further, the tilt angle of the surveying instrument main body 4 with respect to the horizontal is detected by the attitude detector 20, the tilt angle of the distance measuring optical axis 35 with respect to the horizontal is calculated, and a horizontal rotation change of the monopod 3 is detected from the rotation detection image 77 or the observation image 81.

The slope distance is corrected to the horizontal distance based on the tilt angle of the distance measuring optical axis 35 with respect to the horizontal, and a directional angle is calculated based on the horizontal distance. Further, since a length of the monopod 3 (distance from the lower end of the monopod 3 to the machine center of the surveying instrument main body 4) and the inclination of the monopod 3 with respect to the first image pickup optical axis 61 are already-known, three-dimensional coordinates of the object to be measured 2 with reference to the lower end of the monopod 3 (that is, the reference point R) are obtained.

In the above description, based on the rotation detection image 77 or the observation image 81, a rotation angle of the surveying instrument main body 4 around the reference point R is detected. However, in a case where the rotation angle is obtained based on the image, a pixel error of several minutes is incurred. For instance, in case of a pixel error of two minutes, an error of 6 mm is incurred per 10 m. Therefore, to detect the rotation angle with high accuracy, it is necessary to reduce an error at a time of synthesizing two images.

A description will be given below on a method for detecting a rotation angle α of the surveying instrument main body 4 with high accuracy by using a flowchart of FIG. 6 and FIG. 7, FIG. 8, FIG. 9, FIG. 10A, FIG. 10B, FIG. 11A, FIG. 11B, and FIG. 12.

Figure 10A:
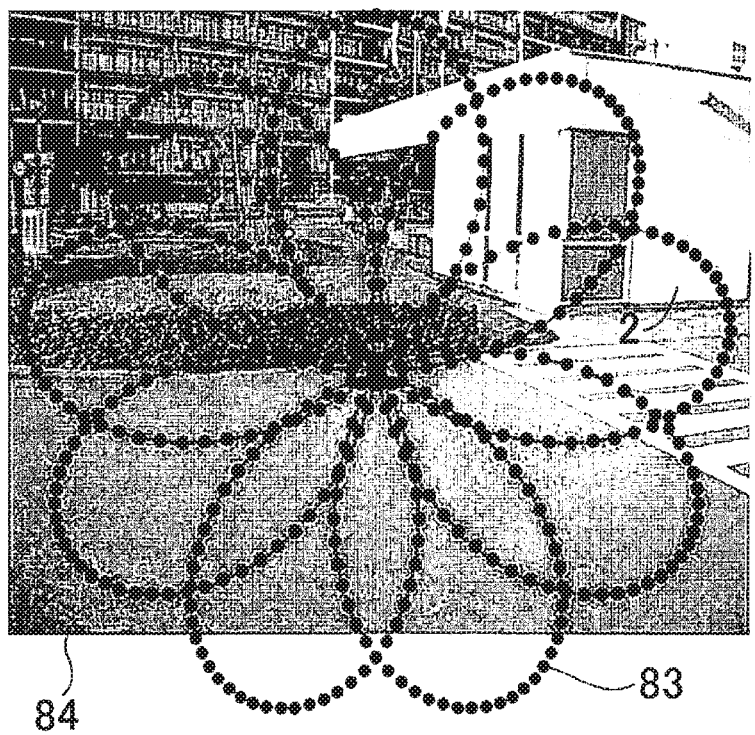
FIG. 10A is an explanatory drawing to show a relationship between a pre-rotation observation image and a pre-rotation flower petal pattern.

(Step 01) First, the lower end of the monopod 3 is installed on the reference point R, the monopod 3 is arbitrarily tilted, and the reference optical axis O is directed toward an arbitrary position of the object to be measured 2. In this state, the arithmetic control module 14 drives the optical axis deflector 19 and carries out a two-dimensional closed loop scan pattern which is a predetermined single cycle, for instance, a pre-rotation flower petal pattern 83 as shown in FIG. 10A. Further, in synchronization with carrying out the pre-rotation flower petal pattern 83, a pre-rotation observation image 84 which is a still image is acquired by the measuring direction image pickup module 21.

Figure 10B:
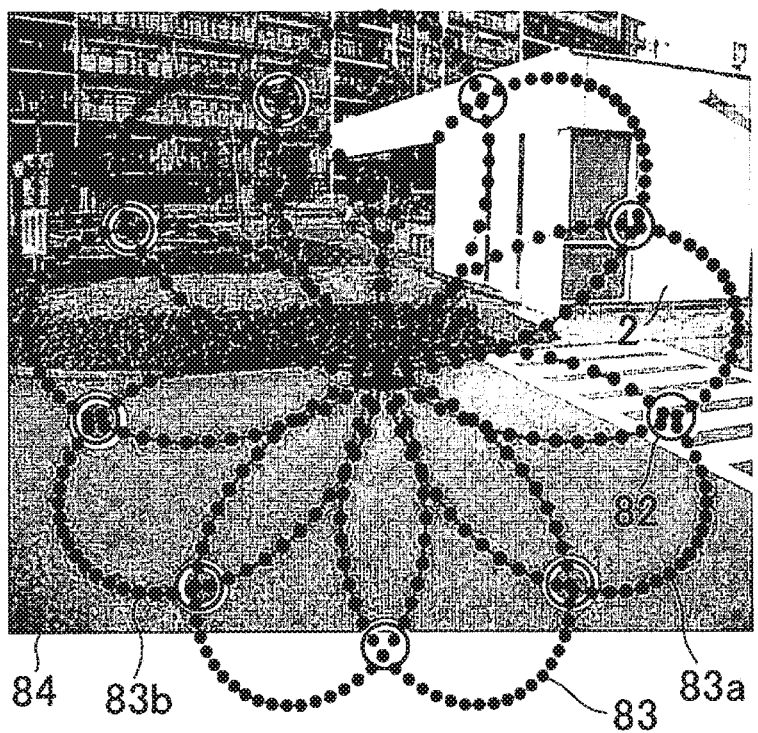
FIG. 10B is an explanatory drawing to show the cross points in the pre-rotation flower petal pattern.

(Step 02) To detect a rotation angle with high accuracy, it is desirable to obtain the pre-rotation flower petal pattern 83 which is one cycle in a state where the surveying instrument main body 4 remains still. A position of a locus of the flower petal pattern 74 is associated with a position of each pixel of the observation image 81 in advance, and a position of each measuring point on the locus of the flower petal pattern 74 in the observation image 81 is known. That is, a position of each intersection (hereinafter a cross point 82) of a first-half locus 83a and a second-half locus 83b obtained by carrying out the pre-rotation flower petal pattern 83 as shown in FIG. 10B in the pre-rotation observation image 84 is known.

Therefore, in a case where the surveying instrument main body 4 has remained still, a distance measurement value of the cross point 82 on the first-half locus 83a is equal to a distance measurement value of the cross point 82 on the second-half locus 83b. On the other hand, in a case where the surveying instrument main body 4 has moved in the first half (0 to 0.2 sec) and the second half (0.2 to 0.4 sec), the distance measurement value (coordinates) of the cross point 82 on the first-half locus 83a is different from the distance measurement value of the cross point 82 on the second-half locus 83b.

The arithmetic control module 14 self-diagnoses whether the distance measurement value of the cross point 82 on the first-half locus 83a coincides with the distance measurement value of the cross point 82 on the second-half locus 83b. In a case where the distance measurement values of the cross points 82 do not coincide with each other, the arithmetic control module 14 informs the worker that the surveying instrument main body 4 has not remained still while carrying out the pre-rotation flower petal pattern 83 which is one cycle by, for instance, giving off an alarm, or the like, and again carries out the pre-rotation flower petal pattern 83 which is one cycle. When the cross points 82 coincide with each other, distance measurement data of the pre-rotation flower petal pattern 83 which is obtained when the cross points 82 coincide with each other and the pre-rotation observation image 84 are stored in the first storage module 15.

Further, the arithmetic control module 14 associates the pre-rotation observation image 84 with a scan result (a distance measurement result, an angle measurement result (deflection angle information), and a reflection intensity) of the pre-rotation flower petal pattern 83. Further, the arithmetic control module 14 calibrates an image distortion (optical distortion) of the pre-rotation observation image 84 based on the deflection angle information with respect to the locus of the pre-rotation flower petal pattern 83.

(Step 03) In a case where the distance measurement value of the cross point 82 on the first-half locus 83a coincides with the distance measurement value of the cross point 82 on the second-half locus 83b, the arithmetic control module 14 judges that the surveying instrument main body 4 has remained still.

Next, the monopod 3 is rotated or spirally rotated, and the reference optical axis O is directed toward the arbitrary position of the object to be measured 2. It is to be noted that a rotation amount at this moment is a rotation amount of which a locus obtained by carrying out the pre-rotation flower petal pattern 83 (hereinafter a locus of the pre-rotation flower petal pattern 83) overlaps a locus obtained by carrying out a post-rotation flower petal pattern 85 (hereinafter a locus of the post-rotation flower petal pattern 85) (as described later) by a predetermined range.

Figure 11A:
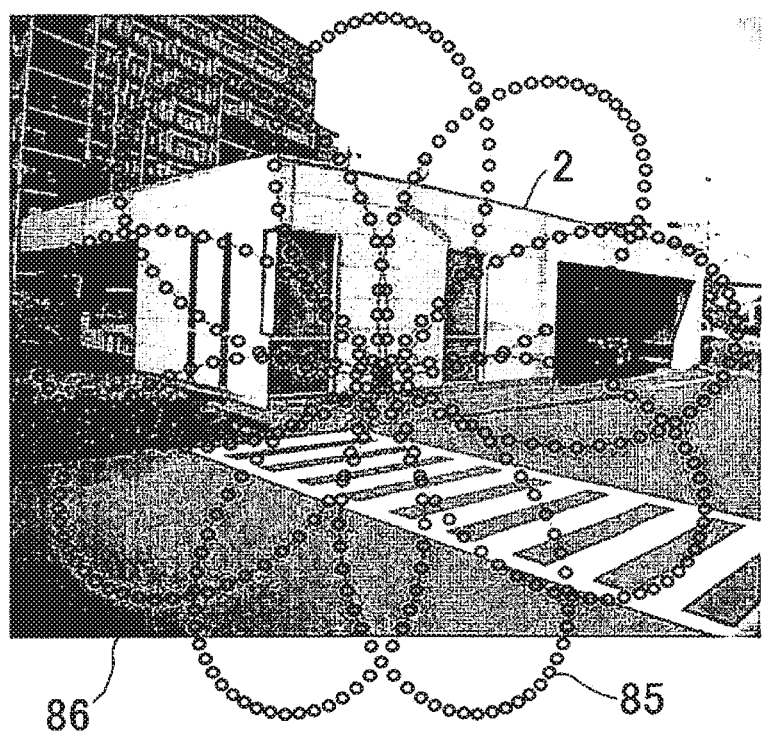
FIG. 11A is an explanatory drawing to show a relationship between a post-rotation observation image and a post-rotation flower petal pattern.

(Step 04) In this state, the arithmetic control module 14 drives the optical axis deflector 19 and carries out a post-rotation flower petal pattern 85 which is a two-dimensional closed loop which is one cycle as shown in FIG. 11A. Further, the arithmetic control module 14 acquires a post-rotation observation image 86 which is a still image by the measuring direction image pickup module 21 in synchronization with carrying out the post-rotation flower petal pattern 85.

Figure 11B:
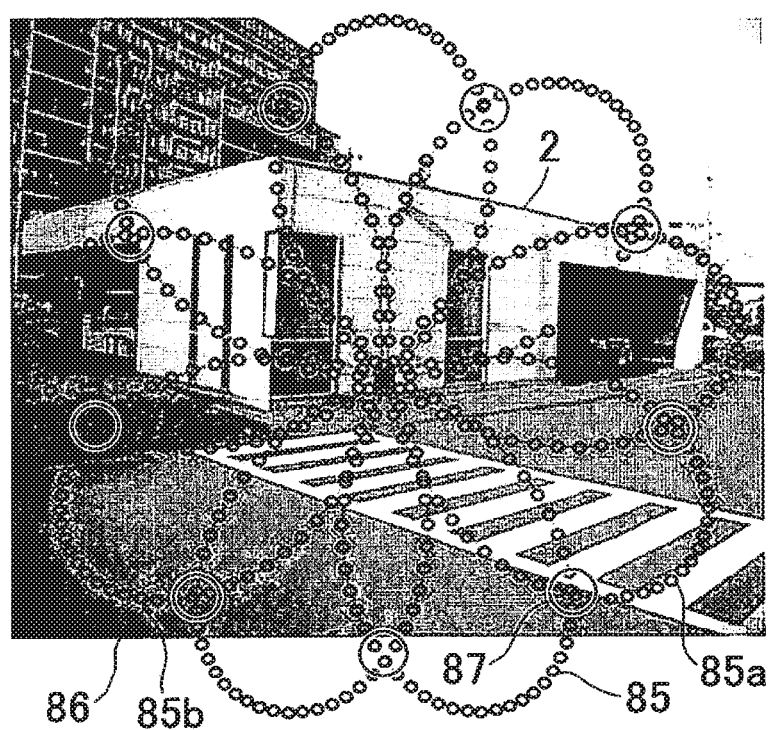
FIG. 11B is an explanatory drawing to show the cross points in the post-rotation flower petal pattern.

(Step 05) The arithmetic control module 14 self-diagnoses whether a distance measurement value of a cross point 87 on a first-half locus 85a coincides with a distance measurement value of the cross point 87 on a second-half locus 85b in the post-rotation observation image 86 as shown in FIG. 11B. In a case where the measurement values of the cross points 87 do not coincide with each other, the arithmetic control module 14 informs the worker that the surveying instrument main body 4 has not remained still while carrying out the post-rotation flower petal pattern 85 which is one cycle by, for instance, giving off an alarm, or the like, and again carries out the post-rotation flower petal pattern 85 which is one cycle. When the cross points 87 coincide with each other, the distance measurement data of the post-rotation flower petal pattern 85 which is obtained when the cross points 87 coincide with each other and the post-rotation observation image 86 are stored in the first storage module 15.

Further, the arithmetic control module 14 associates the post-rotation observation image 86 with a scan result (a distance measurement result, an angle measurement result (deflection angle information), and a reflection intensity) of the post-rotation flower petal pattern 85. Further, the arithmetic control module 14 calibrates an image distortion (optical distortion) of the post-rotation observation image 86 based on the deflection angle information with respect to the locus of the post-rotation flower petal pattern 85.

(Step 06) When the scan result of the pre-rotation flower petal pattern 83 and the scan result of the post-rotation flower petal pattern 85 are obtained, the arithmetic control module 14 carries out a general matching of the pre-rotation observation image 84 and the post-rotation observation image 86. The general matching is carried out based on, for instance, feature points extracted from the pre-rotation observation image 84 and the post-rotation observation image 86.

(Step 07) Since a center of the pre-rotation flower petal pattern 83 and a center of the pre-rotation observation image 84 are known, a position of the locus of the pre-rotation flower petal pattern 83 in the pre-rotation observation image 84 is known. Further, since a center of the post-rotation flower petal pattern 85 and a center of the post-rotation observation image 86 are known, a position of the locus of the post-rotation flower petal pattern 85 in the post-rotation observation image 86 is known. Therefore, the arithmetic control module 14 judges whether one or more intersections (the cross points 88) exist in the locus of the pre-rotation flower petal pattern 83 and the locus of the post-rotation flower petal pattern 85 based on the positions of the pre-rotation flower petal pattern 83 and the post-rotation flower petal pattern 85 in a matching image.

In a case where there is no cross point 88 at all, the arithmetic control module 14 again carries out processings of (Step 03) to (Step 06). It is to be noted that a calculation accuracy of the rotation angle and an accuracy of a detailed matching are improved as the number of the cross points 88 increases. Therefore, in a case where the necessary number of the cross points 88 is set in advance and the actual number is less than the set number, the arithmetic control module 14 may be configured to again carry out the processings of (Step 03) to (Step 06).

Figure 7:
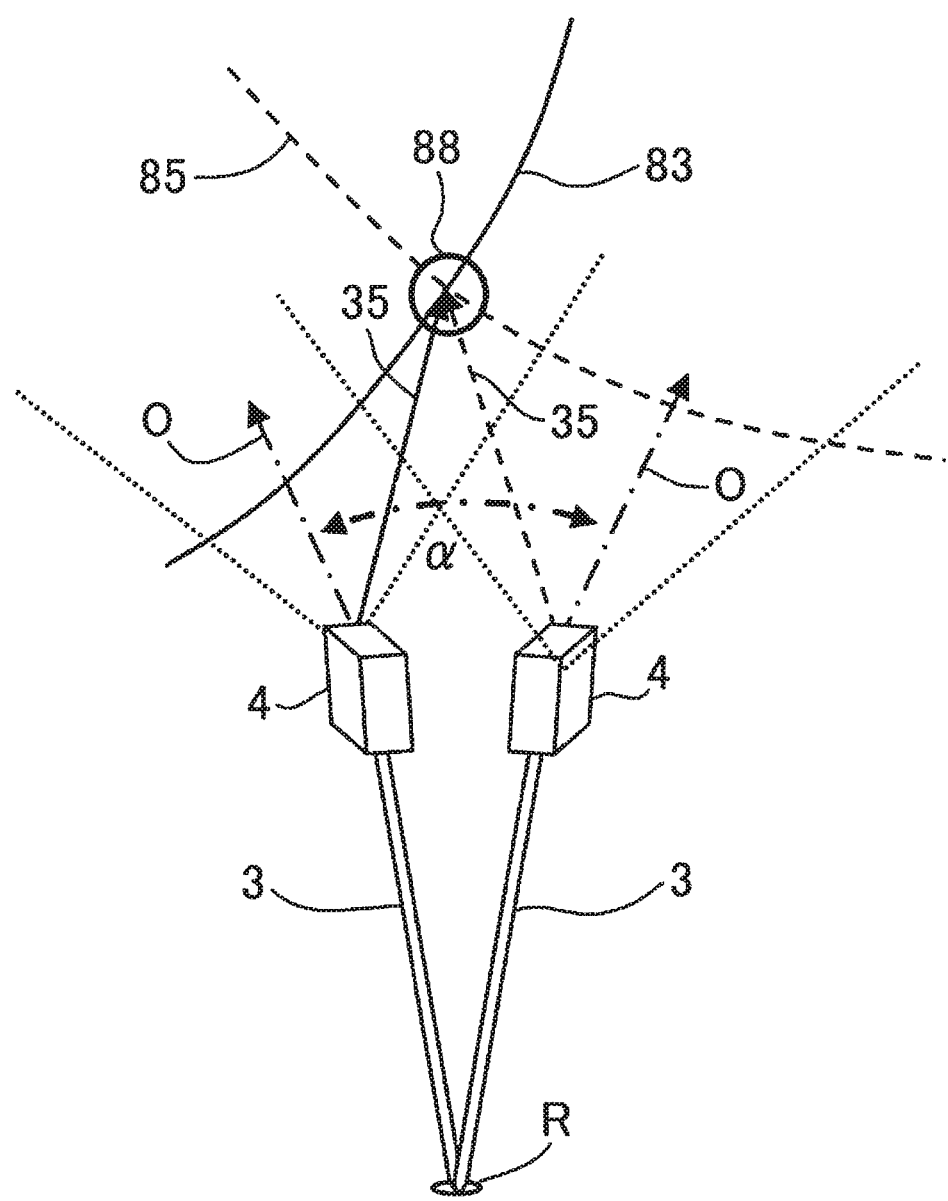
FIG. 7 is an explanatory drawing to show a cross point of scan patterns of a pre-rotation and a post-rotation.

(Step 08) As shown in FIG. 7, both the scan result of the pre-rotation flower petal pattern 83 and the scan result of the post-rotation flower petal pattern 85 are data on a scan locus acquired by the surveying instrument 1 installed on the reference point R. Therefore, the points which are the same distance from the reference point R can be considered as the same point on the object to be measured 2.

On the other hand, the cross point 88 does not necessarily coincide with a measuring point positioned on the locus of the pre-rotation flower petal pattern 83 and on the locus of the post-rotation flower petal pattern 85. Therefore, to obtain an accurate distance or three-dimensional coordinates of the cross point 88, the cross point 88 must be interpolated into the scan result of the pre-rotation flower petal pattern 83 and the scan result of the post-rotation flower petal pattern 85.

Figure 8:
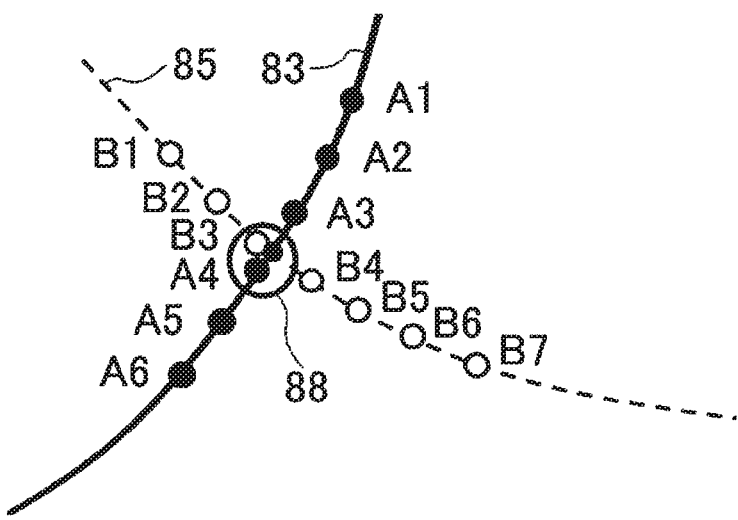
FIG. 8 is an explanatory drawing to show a position of the cross point.
Figure 9:
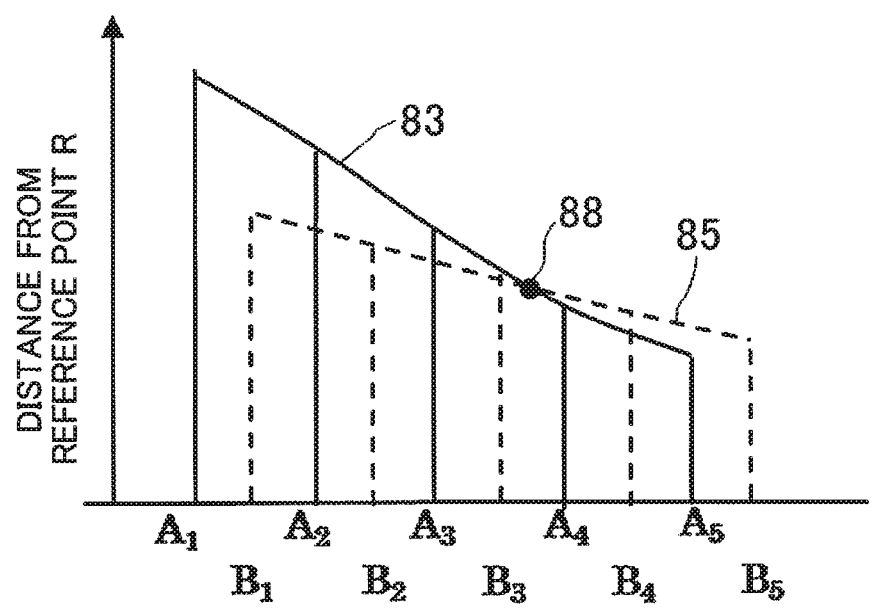
FIG. 9 is an explanatory drawing to show a distance between a scan pattern and a reference point.

FIG. 8 shows a relationship between the locus of the pre-rotation flower petal pattern 83 around a position where the cross point 88 is judged to exist and the measuring points, and a relationship between the locus of the post-rotation flower petal pattern 85 and the measuring points. In FIG. 8, the cross point 88 is positioned between a measuring point A3 and a measuring point A4 on the locus of the pre-rotation flower petal pattern 83 and also positioned between measuring points B3 and B4 on the locus of the post-rotation flower petal pattern 85. Further, FIG. 9 is a graph to show a relationship between a position of each measuring point and distances from the reference point R. It is to be noted that, between the measuring points adjacent to each other, the distances from the reference point R increase or decrease in proportion to distances between the measuring points adjacent to each other.

The arithmetic control module 14 sets each point having the same distance from the reference point R, that is, a point at which the locus of the pre-rotation flower petal pattern 83 crosses the locus of the post-rotation flower petal pattern 85 in FIG. 9 as the cross point 88, and obtains a fine value of the cross point 88 by interpolating the cross point 88 into the scan result of the pre-rotation flower petal pattern 83 and the scan result of the post-rotation flower petal pattern 85 based on the distances of the measuring points adjacent to each other from the reference point R, the detection result of the attitude detector 20, and the like.

Further, in a case where a plurality of cross points 88 exist, the arithmetic control module 14 performs the same processings to each of the cross points 88 and sets each of the cross points 88 as a connected point cloud (a cross point cloud).

Figure 12:
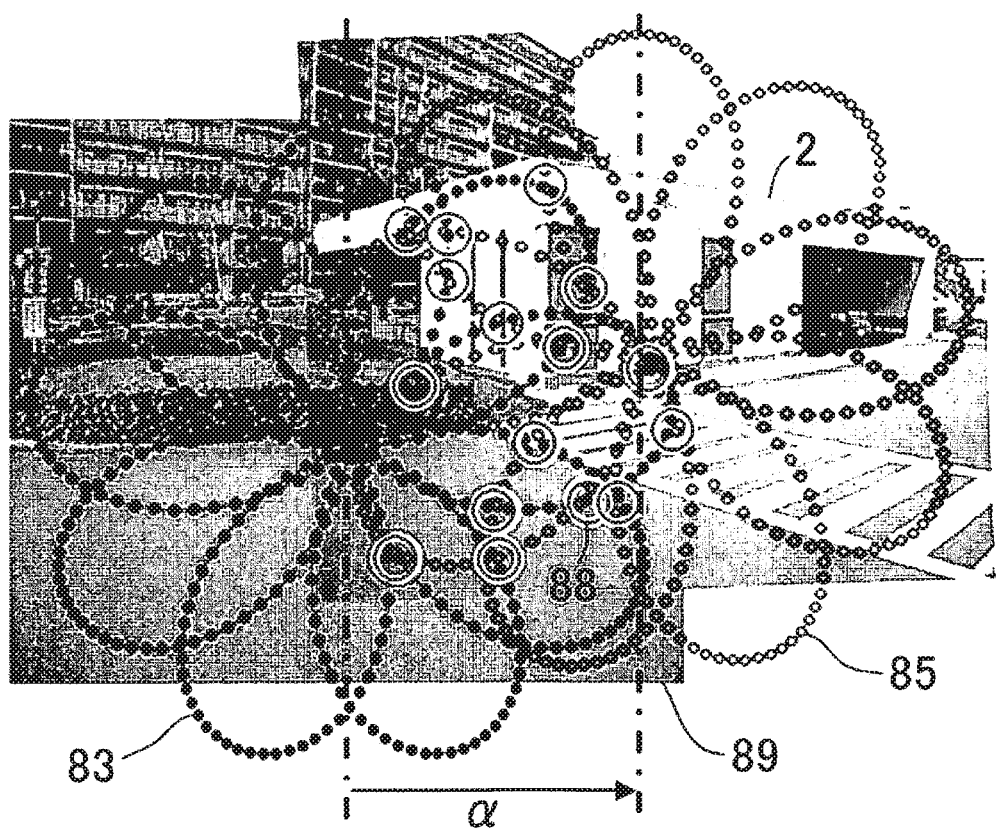
FIG. 12 is an explanatory drawing to show the cross points in a synthesized image and the observation images of the pre-rotation and the post-rotation.

(Step 09) The arithmetic control module 14 carries out the detailed matching of the pre-rotation observation image 84 and the post-rotation observation image 86 based on each of the interpolated cross points 88 or the connected point cloud. The arithmetic control module 14 creates a synthesized image 89 of the pre-rotation observation image 84 and the post-rotation observation image 86 as shown in FIG. 12 by the detailed matching.

(Step 10) The arithmetic control module 14 obtains a deviation between a position (a deflection angle) of each of the cross points 88 with respect to the reference optical axis O of the pre-rotation and a position (a deflection angle) of each of the cross points 88 with respect to the reference optical axis O of the post-rotation and calculates a rotation angle α of the surveying instrument main body 4 around the reference point R.

Alternatively, the arithmetic control module 14 calculates the rotation angle α of the surveying instrument main body 4 based on a positional deviation between the reference optical axis O of the pre-rotation and the reference optical axis O of the post-rotation in the synthesized image 89.

Finally, the arithmetic control module 14 converts the rotation angle α into a horizontal rotation angle with the vertical axis as the center based on the detection result of the attitude detector 20.

It is to be noted that the calculation of the horizontal rotation angle, the calculation of the tilt angle of the distance measuring optical axis 35, the calculation of the horizontal distance, and the like may be executed by the arithmetic control module 14 or may be executed by the calculating module 65.

Further, in the above description, although the flower petal pattern is used as the two-dimensional closed loop scan pattern, any other scan pattern such as a circular scan pattern or a scan pattern in a shape of a numeral 8 may be used as long as they are closed loop scan patterns.

Further, in the first embodiment, although the measurement is performed with the same action as an action of a total station, the measurement can be also performed by using the surveying instrument 1 as a laser scanner.

As shown in FIG. 3, the optical axis deflector 19 can freely deflect the distance measuring optical axis 35 within a range of the deflection range 73. By controlling the rotation of the optical prism 41 and the optical prism 42, the scanning with the locus of the flower petal pattern 74 can be performed. The distance measurement data can be acquired along the locus of the flower petal pattern 74 by irradiating a pulsed distance measuring light during a scan process. Further, in order to increase a distance measurement data density (scan density), it is necessary that the flower petal pattern 74 is rotated around a center of the scan pattern in a circumferential direction by a predetermined angle each time the flower petal pattern 74 is scanned for one pattern. Further, the images are acquired respectively by the measuring direction image pickup module 21 and the lower image pickup module 5 synchronously with the scanning.

Further, a scan center can be changed (in a case where the scan range is to be changed) in a state where a scanning in the all deflection range is performed, by rotating the monopod 3 around the axis, or by spirally rotating the monopod 3 around the lower end, or by changing the inclination angle of the monopod 3. Thereby, the distance measurement data in a desired direction (point cloud data or scan data) within a desired range can be easily acquired.

Figure 13:
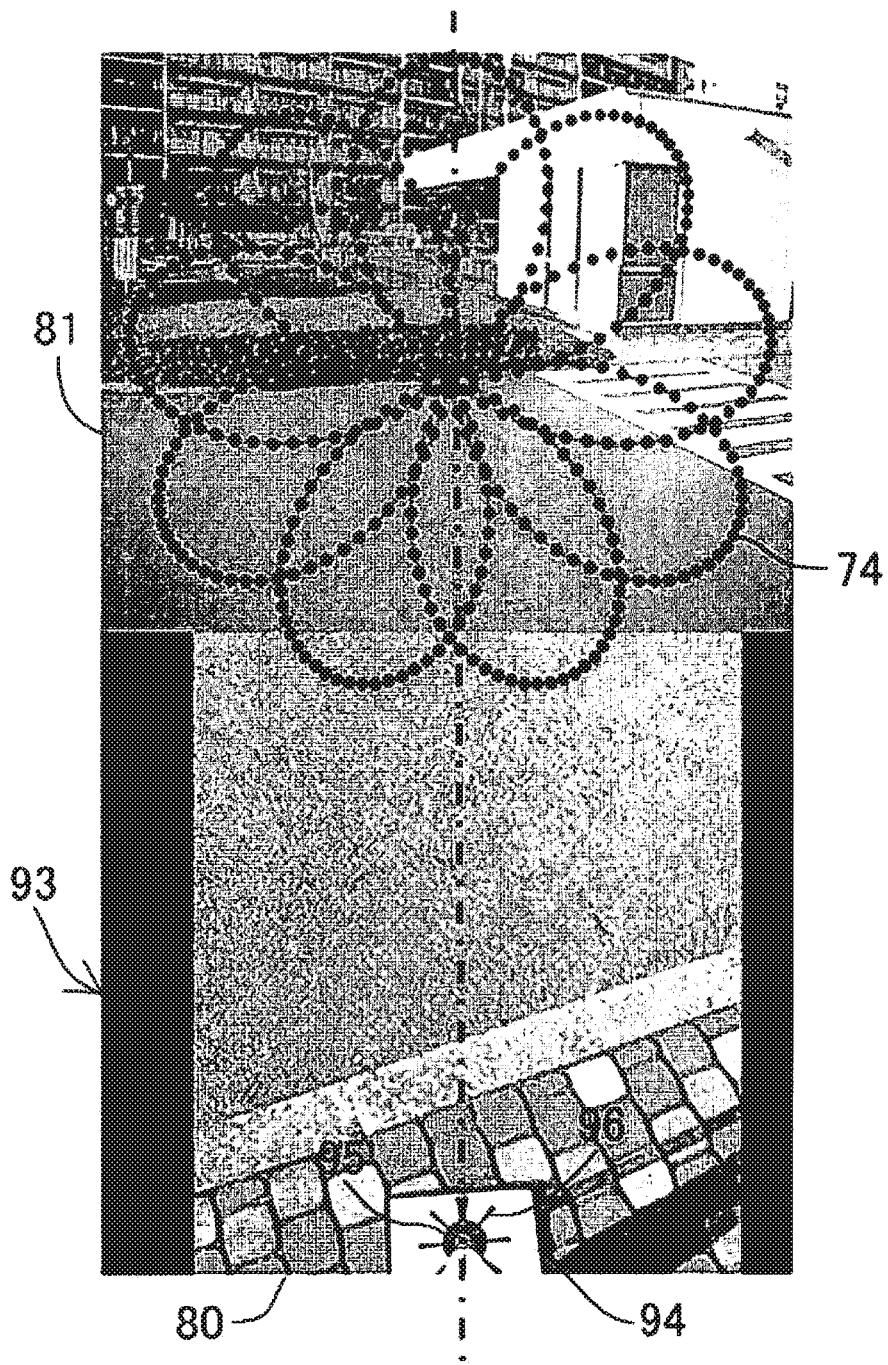
FIG. 13 is an explanatory drawing to show a relationship between a first image and a second image of the pre-rotation.
Figure 14:
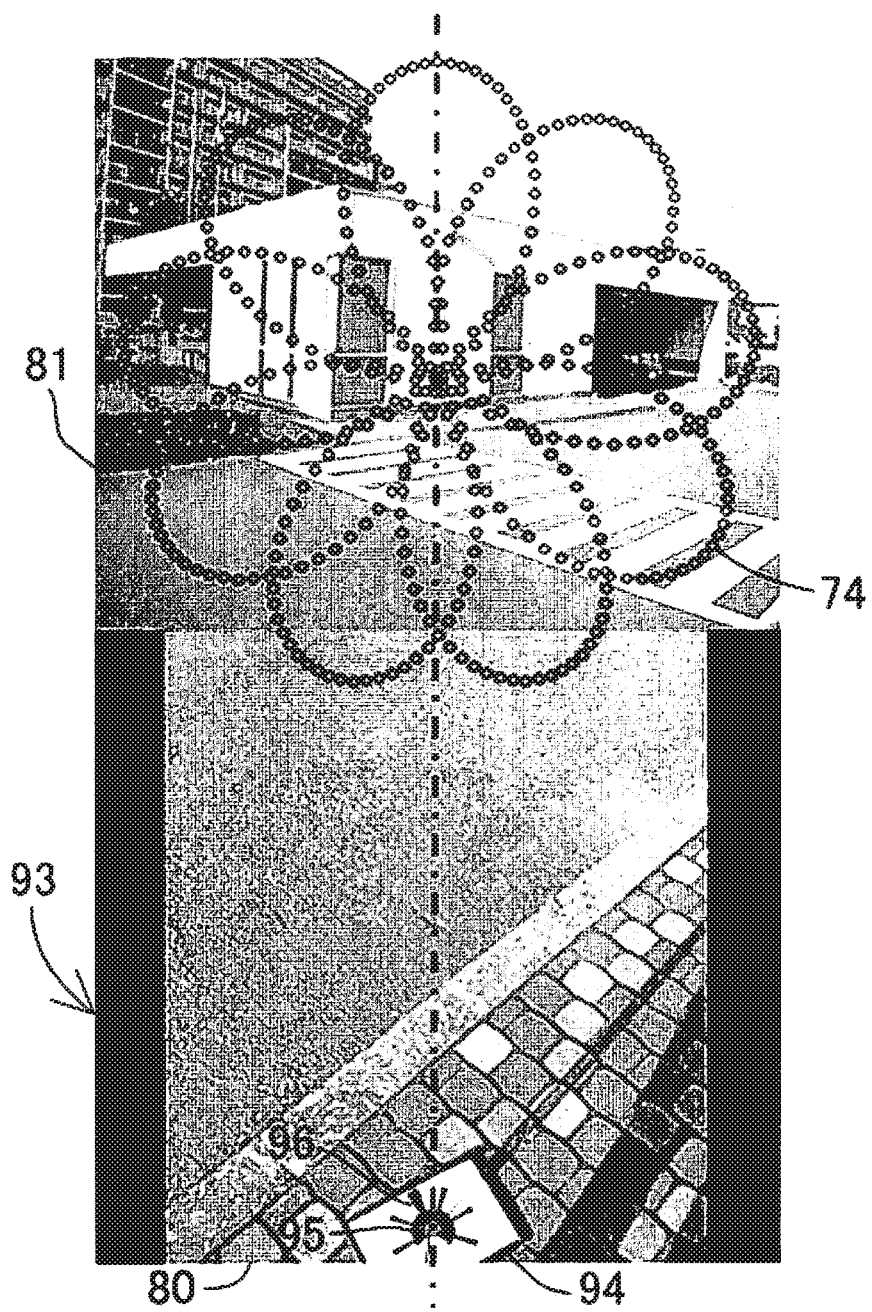
FIG. 14 is an explanatory drawing to show a relationship between a first image and a second image of the post-rotation.

FIG. 13 and FIG. 14 show an example of the observation image 81 acquired by the measuring direction image pickup module 21 and the lower image 80 acquired by the lower image pickup module 5.

In a case of synthesizing the observation image 81 and the lower image 80, the synthesizing can be performed by using an overlap portion of the both images. Alternatively, the scanning is performed so that a part of the locus of the flower petal pattern 74 is included in the lower image 80, and the observation image 81 and the lower image 80 can be synthesized immediately by using the distance measurement data along the locus of the flower petal pattern 74 in the observation image 81 and the distance measurement data along the locus of the flower petal pattern 74 in the lower image 80.

It is to be noted that as the data along the locus used for the synthesizing, the data along the loci included common to the observation image 81 and the lower image 80 may be used, or the observation image 81 and the lower image 80 may be synthesized by using a coordinate value of the data along the loci included individually in the observation image 81 and the lower image 80.

By synthesizing the observation image 81 and the lower image 80, a synthesized observation image 93 of a wide range, which includes an area from the reference point R to the object to be measured 2, can be acquired, a confirmation of the measurement range and the measuring position is facilitated, and a workability is improved. Further, an image having the three-dimensional data per each pixel can be acquired by associating the observation image 81 or the synthesized observation image 93 with the data along a locus obtained by a two-dimensional scanning.

It is to be noted that, in FIG. 13 and FIG. 14, to enable to easily detect a large rotation angle, the monopod 3 is installed on a marker plate 94. A circular marker 95 is formed on the marker plate 94, and the marker 95 has an angle scale 96 radially formed at the predetermined angle interval.

When the monopod 3 is installed on a center of the marker 95, the arithmetic control module 14 can calculate a rotation of the surveying instrument main body 4 based on a rotational displacement of the marker 95 at a time of rotating the surveying instrument main body 4.

For this reason, even if the feature points cannot be extracted and the rotational displacement cannot be calculated only by the rotation detection image 77, the rotation angle of the surveying instrument main body 4 can be calculated based on the lower image 80 or the synthesized observation image 93.

As described above, in the present embodiment, each of the points having the same distance from the reference point R among the points on the locus of the pre-rotation flower petal pattern 83 and the points on the locus of the post-rotation flower petal pattern 85 is set as the intersection of the locus of the pre-rotation flower petal pattern 83 and the locus of the post-rotation flower petal pattern 85 (the cross point 88 or the connected point cloud). Further, based on the position (the deflection angle) of the cross point 88 with respect to the reference optical axis O of the pre-rotation and the position (the deflection angle) of the cross point 88 with respect to the reference optical axis O of the post-rotation, the rotation angle α of the surveying instrument main body 4 is calculated.

Therefore, a detection error which is unavoidable by a detection of the rotational displacement based on images can be reduced, and the rotation angle α can be calculated with high accuracy.

Further, in the first embodiment, the image matching of the pre-rotation observation image 84 and the post-rotation observation image 86 is carried out based on the cross point 88 or the connected point cloud, not based on the feature points in the images. As a result, an image matching with high accuracy can be performed.

Further, a calibration value for the image distortion of the pre-rotation observation image 84 is obtained based on the scan result of the pre-rotation flower petal pattern 83, and the image is calibrated and used. Therefore, even in a case where the rotation angle α of the surveying instrument main body 4 is calculated based on a positional deviation of the synthesized image 89, the rotation angle α can be obtained with high accuracy.

Further, in the first embodiment, the rotation angle of the surveying instrument main body 4 can be detected without additionally providing a rotation angle detector such as an encoder or the like. Therefore, an instrument configuration of the surveying instrument main body 4 can be simplified, and a manufacturing cost can be reduced.

Further, in the first embodiment, based on a distance measurement result by the measuring unit 24, a detection result of the projecting direction detecting module 22, and the detection result of the attitude detector 20, the three-dimensional coordinates of the object to be measured 2 with reference to the reference point R can be obtained.

Therefore, the surveying instrument main body 4 need not to be vertically installed, a time for installing can be reduced, and no skill is required. As a result, the surveying instrument 1 can be easily installed in a short time.

Further, even in a case where a direction or a position of the surveying instrument 1 is frequently changed, the measurement can be easily performed in a short time.

The invention claimed is:

1. A surveying instrument comprising: a monopod installed on a reference point, a surveying instrument main body provided at a known distance from a lower end of said monopod and at a known angle with respect to an axis of said monopod and having a reference optical axis, and an operation panel provided on said monopod and having a display unit, wherein said surveying instrument main body includes a measuring unit for irradiating a distance measuring light, for receiving a reflected distance measuring light and for measuring a distance to an object to be measured, an optical axis deflector for deflecting said distance measuring light with respect to said reference optical axis, a measuring direction image pickup module which includes said object to be measured and for acquiring an observation image in a predetermined relationship with said reference optical axis, an attitude detector for detecting a tilt of said surveying instrument main body with respect to the horizontal, and an arithmetic control module for making said measuring unit perform a distance measurement along a predetermined scan pattern, and wherein said arithmetic control module performs an image pickup of said object to be measured by said measuring direction image pickup module and scans said object to be measured with said distance measuring light by a closed loop scan pattern respectively at a pre-rotation and a post-rotation of said surveying instrument main body, obtains a cross point of a locus of said scan pattern of the pre-rotation and a locus of said scan pattern of the post-rotation based on an image of the pre-rotation and an image of the post-rotation, obtains a deflection angle of said cross point with respect to said reference optical axis of the pre-rotation and a deflection angle of said cross point with respect to said reference optical axis of the post-rotation, and calculates a rotation angle of said surveying instrument main body based on a deviation between both of said deflection angles.

2. The surveying instrument according to claim 1, wherein said arithmetic control module obtains said locus of said scan pattern of the pre-rotation and said locus of said scan pattern of the post-rotation and sets points which are the same distance from said reference point on each locus as said cross point.

3. The surveying instrument according to claim 2, wherein said arithmetic control module associates said observation image acquired at the pre-rotation and a scan result of the pre-rotation with said observation image acquired at the post-rotation and a scan result of the post-rotation respectively, synthesizes said observation image of the pre-rotation with said observation image of the post-rotation based on said cross point and creates a synthesized image.

4. The surveying instrument according to claim 3, wherein said arithmetic control module calculates a rotation angle of said surveying instrument main body based on a positional deviation between said reference optical axis of the pre-rotation and said reference optical axis of the post-rotation in said synthesized image.

5. The surveying instrument according to claim 4, wherein said arithmetic control module calibrates an image distortion of said observation image based on a deflection angle information with respect to said locus of said scan pattern.

6. The surveying instrument according to claim 5, wherein said arithmetic control module converts said rotation angle of said surveying instrument main body into a horizontal rotation angle based on a detection result of said attitude detector.

7. The surveying instrument according to claim 6, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

8. The surveying instrument according to claim 5, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

9. The surveying instrument according to claim 4, wherein said arithmetic control module converts said rotation angle of said surveying instrument main body into a horizontal rotation angle based on a detection result of said attitude detector.

10. The surveying instrument according to claim 9, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

11. The surveying instrument according to claim 4, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

12. The surveying instrument according to claim 3, wherein said arithmetic control module converts said rotation angle of said surveying instrument main body into a horizontal rotation angle based on a detection result of said attitude detector.

13. The surveying instrument according to claim 12, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

14. The surveying instrument according to claim 3, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

15. The surveying instrument according to claim 2, wherein said arithmetic control module converts said rotation angle of said surveying instrument main body into a horizontal rotation angle based on a detection result of said attitude detector.

16. The surveying instrument according to claim 15, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

17. The surveying instrument according to claim 2, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

18. The surveying instrument according to claim 1, wherein said arithmetic control module converts said rotation angle of said surveying instrument main body into a horizontal rotation angle based on a detection result of said attitude detector.

19. The surveying instrument according to claim 18, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

20. The surveying instrument according to claim 1, further comprising an external image pickup module which is provided at a known position with respect to said surveying instrument main body and has a known relationship with respect to said reference optical axis, wherein said external image pickup module has an external image pickup optical axis directed toward a lower side and acquires a lower image including a lower end and a periphery of said monopod, and wherein said arithmetic control module obtains a displacement between said lower images of a pre-rotation and a post-rotation by a rotation around an axis of said monopod and calculates the rotation angle of said surveying instrument main body around said reference point based on said displacement.

* * * * *